(12) United States Patent
Horita

(10) Patent No.: US 6,469,965 B1
(45) Date of Patent: Oct. 22, 2002

(54) APPARATUS FOR AND METHOD OF PLAYING BACK OPTICAL DISC

(75) Inventor: Masayuki Horita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/409,433

(22) Filed: Sep. 30, 1999

(30) Foreign Application Priority Data

Oct. 2, 1998 (JP) ............................................. 10-280913

(51) Int. Cl.[7] ................................................. G11B 7/00
(52) U.S. Cl. .................. 369/53.2; 369/53.28; 369/44.25
(58) Field of Search ........................... 369/44.25, 44.36, 369/53.2, 53.1, 52.1, 53.28

(56) References Cited

U.S. PATENT DOCUMENTS

| 5,671,203 | A | | 9/1997 | Ra ................................ 369/58 |
|---|---|---|---|---|
| 5,706,269 | A | * | 1/1998 | Ogura et al. .................... 369/94 |
| 5,710,749 | A | | 1/1998 | Tsukai et al. ................... 369/58 |
| 5,831,953 | A | | 11/1998 | Numata .......................... 369/58 |
| 5,859,824 | A | | 1/1999 | Izumi et al. ................... 369/58 |
| 6,052,344 | A | * | 4/2000 | Ueki ........................ 369/44.27 |
| 6,147,941 | A | * | 11/2000 | Kamagai ................. 369/44.26 |

* cited by examiner

*Primary Examiner*—Nabil Hindi
(74) *Attorney, Agent, or Firm*—Jay H. Maioli

(57) ABSTRACT

An optical disc playback apparatus selectively plays back a plurality of optical discs having different numbers of recording layers and/or different positions of recording layers in the thickness direction of the optical disc. In the optical disc playback apparatus, a light beam is applied to a loaded optical disc, and reflected light from the optical disc upon application of the light beam is detected. A signal is generated based on the reflected light which is detected, and the number of peaks of the generated signal and timings at which the peaks are outputted are detected. The type of the loaded disc is determined based on the detected number of peaks and/or the detected timings.

19 Claims, 13 Drawing Sheets

FIG. 2A
CD-DA
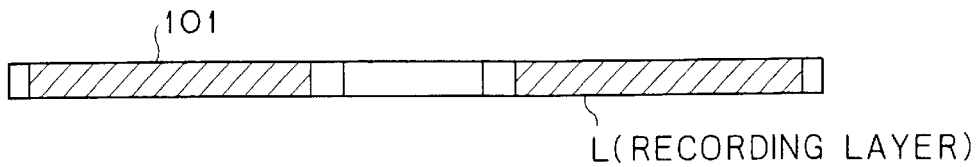
L (RECORDING LAYER)
FIG. 2B
SINGLE-LAYER HD DISC
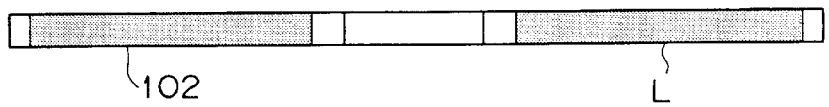
FIG. 2C
HYBRID DISC — L2 (2ND RECORDING LAYER)
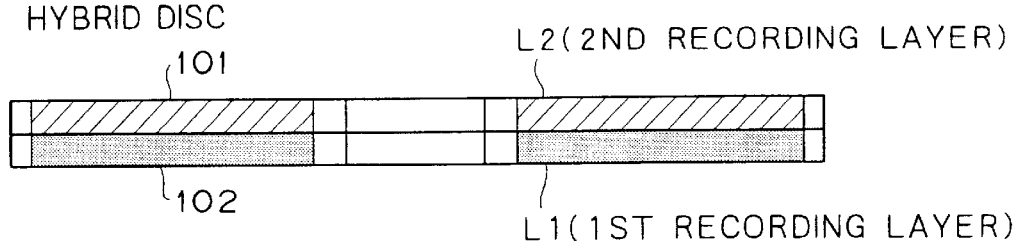
L1 (1ST RECORDING LAYER)
FIG. 2D
MULTI-LAYER HD DISC
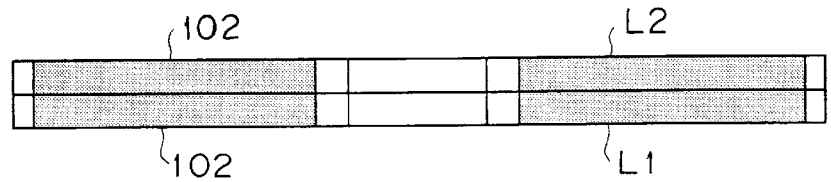
 : CD LAYER (CD DATA RECORDING LAYER)
 : HD LAYER (HD DATA RECORDING LAYER)

CD-DA

SINGLE-LAYER HD DISC

HYBRID DISC

MULTI-LAYER HD DISC

CD-DA

SINGLE-LAYER HD DISC

HYBRID DISC

MULTI-LAYER HD DISC

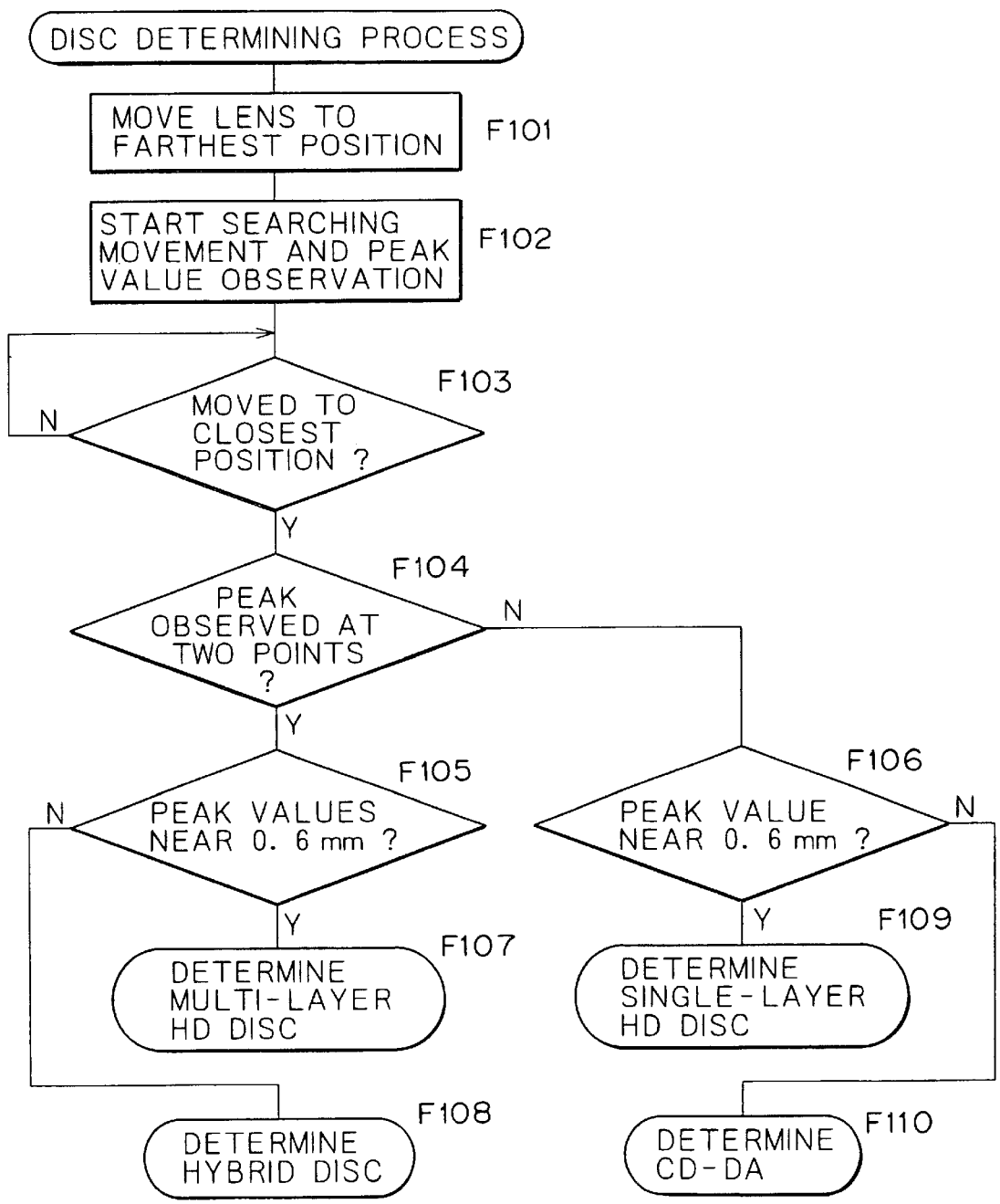

CD-DA

SINGLE-LAYER HD DISC

HYBRID DISC

MULTI-LAYER HD DISC

CD-DA

SINGLE-LAYER HD DISC

HYBRID DISC

MULTI-LAYER HD DISC

APPARATUS FOR AND METHOD OF PLAYING BACK OPTICAL DISC

BACKGROUND OF THE INVENTION

The present invention relates to an apparatus for and a method of, selectively playing back a plurality of optical discs having different numbers of recording layers and/or different positions of recording layers along the thickness of the optical discs, with a device for determining the type of an optical disc which has been loaded.

Compact discs (hereinafter referred to as CD-DA (CD-DIGITAL AUDIO) are presently in widespread use, and DVDs (Digital Versatile Discs) have been proposed as new optical discs having a greater capacity than the CD-DA.

A DVD is optical disk having a diameter of 12 cm with information recorded at a track pitch of 0.8 μm which is one half of the related art CD track pitch of 1.6 μm, in a high density of about 4 Gbytes on one surface by a semiconductor laser whose wavelength has been changed to 650 nm, for example, from 780 nm for CDs, according to an improved modulation process of the EFM (Eight to Fourteen Modulation) employed for CDs.

Based on the above DVD specifications, there has also been developed a multilayer disc having two layers as recording layers.

Since disks of various types such as CD-DA and DVD are present in the market, playback apparatus are required to play back those discs of various types.

Playback apparatus that are compatible with various types of discs need to change laser wavelengths and decoding schemes depending on the type of a disk to be played back. Therefore, when a disc is loaded into a playback apparatus, it is necessary for the playback apparatus to determine the type of the disc.

The type of a disc can be determined by reading management information, e.g., TOC, from the disk. However, such a process is problematic in that it is time-consuming to determine the disc type.

For example, a playback apparatus having a CD-DA pickup and decoding system and a DVD pickup and decoding system carries out a start-up process for laser beam application and servo control with one of the pickups because the type of a loaded disc is unknown, and then reaches a condition capable of reading data for reading TOC data. If the type of the loaded disc and the used pickup do no match each other, then it is necessary to change to the other pickup for a start-up process for laser beam application and servo control. Therefore, it takes a certain time until the TOC data can be read.

For the reasons described above, if it takes a certain time to determine the type of a disc when the disc is loaded, then the user has to wait a long period of time before the disk actually starts to be played back.

Some sensor mechanism may be provided to determine the type of a disc when the disc is loaded. However, the addition of such a sensor mechanism presents an obstacle to efforts to simplify the structure of the playback apparatus and reduce the cost thereof.

SUMMARY OF THE INVENTION

It is an object of the present invention to be able to determine the type of a disk quickly when the disk is loaded without the need for special components such as a sensor mechanism or the like.

According to the present invention, there is provided an apparatus for selectively playing back a plurality of optical discs having different numbers of recording layers and/or different positions of recording layers along the thickness of the optical discs, including applying a device for applying a light beam to a loaded optical disc, a photodetector device for detecting reflected light from the optical disc upon application of the light beam from the applying device, a signal generator for generating a signal based on the reflected light detected by the photodetector, a detector for detecting the number of peaks of the signal generated by the signal generator and timings at which the peaks are outputted, a deciding device for determining the type of the loaded optical disc based on the detected number of peaks and/or the detected timings, and a setting device for setting a playback condition depending on the type of the loaded optical disc determined by the deciding device.

According to the present invention, there is also provided an apparatus for selectively playing back a first optical disc having a single recording layer and a second optical disc having a plurality of recording layers, including an applying device for applying a light beam to a loaded optical disc, a photodetector for detecting reflected light from the optical disc upon application of the light beam from the applying device, a signal generator for generating a signal based on the reflected light detected by the photodetector, a detector for detecting the number of peaks of the signal generated by the signal generator and timings at which the peaks are outputted, a deciding device for determining the type of the loaded optical disc based on the detected number of peaks and/or the detected timings, and a setting device for setting a playback condition depending on the type of the loaded optical disc determined by the deciding device.

According to the present invention, there is further provided a method of selectively playing back a plurality of optical discs having different numbers of recording layers and/or different positions of recording layers along the thickness of the optical discs, including the steps of applying a light beam to a loaded optical disc, detecting reflected light from the optical disc upon application of the light beam, generating a signal based on the reflected light which is detected, detecting the number of peaks of the generated signal and timings at which the peaks are outputted, determining the type of the loaded optical disc based on the detected number of peaks and/or the detected timings, and setting a playback condition depending on the type of the loaded optical disc determined by the decision means.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2A is a cross-sectional view of a related art CD-DA;

FIG. 2B is a cross-sectional view of a single-layer HD disc;

FIG. 2C is a cross-sectional view of a hybrid disc comprising a multi-layer disc having a recording layer in which CD data are recorded and another recording layer in which HD data are recorded;

FIG. 2D is a cross-sectional view of a multi-layer HD disc comprising a bonded multi-layer disc having recording layers in which HD data are recorded;

FIG. 8 is a flowchart of a disc determining process of the playback apparatus according to the embodiment of the present invention;

DESCRIPTION OF THE PREFERRED EMBODIMENTS

Embodiments of a playback apparatus according to the present invention will be described below with respect to various topics in the sequence given below. The playback apparatus is compatible with recording mediums as optical discs.

1. Disc type
2. Structure of the playback apparatus
3. First process of disc determining operation
4. Second process of disc determining operation
5. Third process of disc determining operation
6. Modifications 1. Disc Type The playback apparatus according to the present invention is compatible with discs of four types as described later on. Disc types are roughly classified into a single-layer disc and a multi-layer disc according to the number of recording layers. These disc types will be described below with reference to FIGS. 1A and 1B.

Figure 1A:
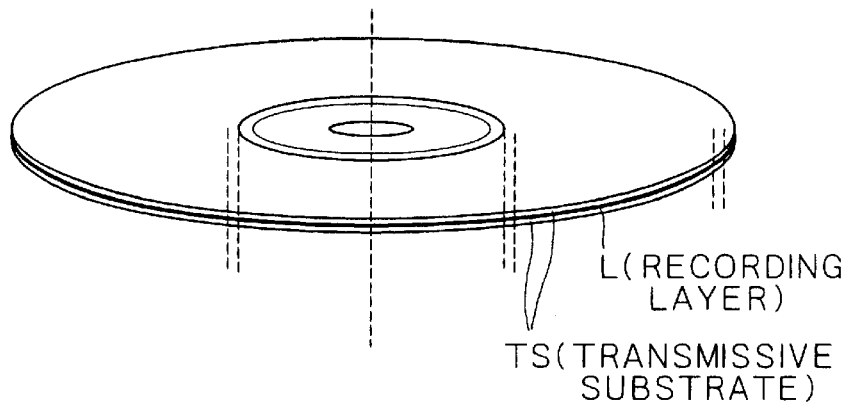
FIG. 1A is a perspective view of a single-layer disc.

FIG. 1A illustrates a single-layer disc having a single recording layer L which contains pits of recorded data, and transmissive substrates TS mounted on respective upper and lower surfaces of the recording layer L. The single-layer disc shown in FIG. 1A corresponds to a CD-DA or a DVD which has heretofore been known in the art.

Figure 1B:
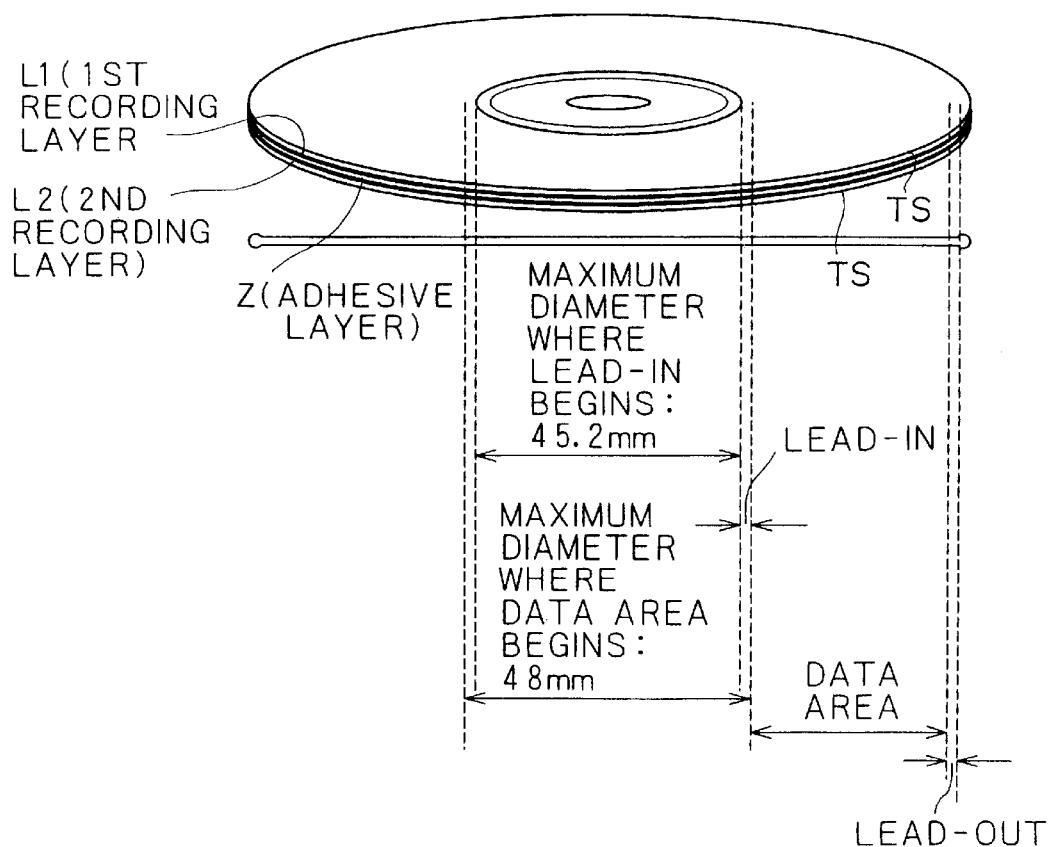
FIG. 1B is a perspective view of a multi-layer disc.

FIG. 1B illustrates a multi-layer disc having two recording layers, i.e., a first recording layer L1 and a second recording layer L2, which contain pits of recorded data. The first recording layer L1 and the second recording layer L2 are bonded to each other by an adhesive layer Z. Transmissive substrates TS are mounted on respective upper and lower surfaces of the first and second recording layers L1, L2.

Each of the single-layer disc and the multi-layer disc may have a diameter of 12 cm or 8 cm.

The discs generally have three areas called a lead-in area, a data area, and a lead-out area successively arranged from the inner circumference thereof.

The lead-in area starts from a position having a maximum diameter of 45.2 mm, and the data area starts from a position having a maximum diameter of 48 mm.

In addition to the types of single- and multi-layer discs classified according to the number of recording layers, disc types are also classified according to the positions in which recording layers are formed (along the thickness of the disc).

Specifically, the latter classification is based on the difference between a data recording layer according to the CD principles and a data recording layer according to the DVD principles.

For illustrative purposes, data according to the CD principles will be referred to as "CD data", and a recording layer in which CD data are recorded will be referred to as "CD layer".

The CD data are of a data format employed by ordinary CD-DA, i.e., data produced by modulating a 16-bit digital audio signal sampled at 44.1 kHz according to the EFM (Eight to Fourteen Modulation) process.

The applicant of the present application has proposed a data format according to the DVD principles for data higher inequality than CD data. This data format is used to record a 1-bit digital audio signal modulated according to the ΣΔ modulation process at a very high sampling frequency of 2.842 MHz which is 16 times the above sampling frequency of 44.1 kHz. The data recording according to this data format will be referred to as "HD (Hi-Definition) data", and a recording layer in which HD data are recorded will be referred to as "HD layer".

The differences between the CD data and the HD data will briefly be described below.

The CD data have a frequency band ranging from 5 to 20 kHz, and the HD data have a wider frequency band ranging from DC to 100 kHz.

The CD data have a dynamic range of 98 (dB) for an entire audio band, and the HD data have a dynamic range of 120 (dB) for an entire audio band.

Data recorded in the CD layer have a minimum pit length of 0.83 μm whereas data recorded in the HD layer have a minimum pit length of 0.4 μm.

The CD layer has a track pitch of 1.6 μm whereas the HD layer has a track pitch of 0.74 μm.

A readout laser beam for the CD layer has a wavelength of 780 nm whereas a readout laser beam for the HD layer has a shorter wavelength of 650 nm.

Furthermore, the lens of an optical head for the CD layer has a numerical aperture (NA) of 0.45 whereas the lens of an optical head for the HD layer has a numerical aperture of 0.6.

With the minimum pit length, the track pitch, the numerical aperture (NA), and the laser beam wavelength being thus changed, the HD layer can record data in a high data capacity of 4.7 GB while the CD layer can record data in a data capacity of 780 MB.

The discs of four types which record the CD data or the HD data, have single- and multi-layer structures, and can be played back by the playback apparatus according to the present invention are "CD-DA", "single-layer HD disc", "hybrid disc", and "multi-layer HD disc".

The differences between these discs will be described below with reference to FIGS. 2A through 2D and 3A through 3D. FIGS. 2A through 2D schematically show data types recorded in the recording layers of the discs of the various types, and FIGS. 3A through 3D schematically show positions in which the recording layers are formed.

[CD-DA]

The CD-DA refers to an audio compact disc which has heretofore been in widespread use, and comprises a single-layer disc with a recording layer L as shown in FIG. 2A. The recording layer L serves as a CD layer 101, shown hatched, for recording CD data.

Figure 3A:
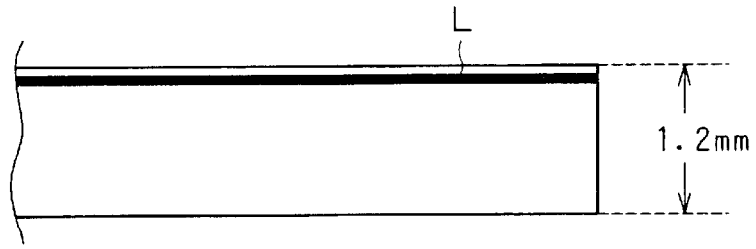
FIG. 3A is a fragmentary cross-sectional view showing a recording layer of the related art CD-DA shown in FIG. 2A.

With the CD-DA, as shown in FIG. 3A, the recording layer L is formed at a position spaced about 1.2 mm from a disc face (a laser beam entrance surface at the lower disc surface in FIG. 3A), i.e., a position near the labeled surface of the disc.

[Single-layer HD disc]

The single-layer HD disc is a DVD as a single-layer disc. As shown in FIG. 2B, the single-layer HD disc has a recording layer L serves as an HD layer 102, shown stippled, for recording HD data.

Figure 3B:
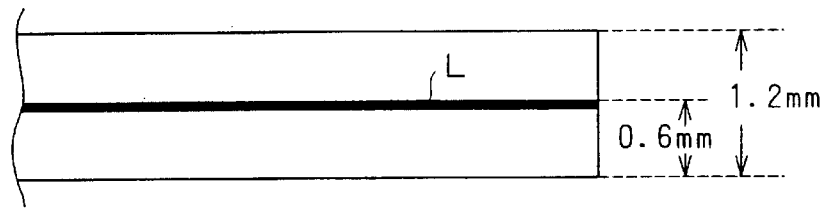
FIG. 3B is a fragmentary cross-sectional view showing a recording layer of the single-layer HD disc shown in FIG. 2B.

With the single-layer HD disc, as shown in FIG. 3B, the recording layer L is formed at a position spaced about 0.6 mm from a disc face (a laser beam entrance surface), i.e., a substantially central position along the thickness of the disc.

Since the single-layer HD, disc is a medium for recording audio data as HD data, it can reproduce sounds higher in quality than the CD-DA.

[Hybrid disk]

The hybrid disc includes a combination of the CD-DA and the single-layer HD disc that are physically bonded to each other.

As shown in FIG. 2C, the hybrid disc comprises a multi-layer disc having a first recording layer L1 and a second recording layer L2. The first recording layer L1 serves as an HD layer 102 for recording HD data, and the second recording layer L2 serves as a CD layer 101 for recording CD data.

Figure 3C:
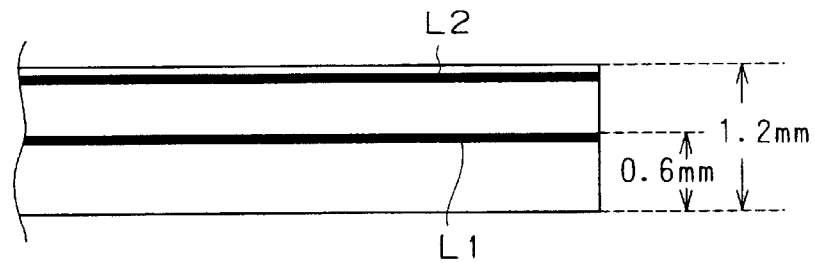
FIG. 3C is a fragmentary cross-sectional view showing the recording layers of the hybrid disc shown in FIG. 2C.

With the hybrid disc, as shown in FIG. 3C, the first recording layer L1 is formed at a position spaced about 0.6 mm from a disc face (a laser beam entrance surface), and the second recording layer L2 is formed at a position spaced about 1.2 mm from the disc face (the laser beam entrance surface).

The hybrid disc records data (program) of music or the like which are of the same contents, e.g., the same music piece, in each of the layers. Specifically, the same contents of data of music or the like may be recorded as data of ordinary quality of the CD level (CD data) in the CD layer 101, and as data of higher quality (HD data) in the HD layer 102. According to this recording technique, a CD player which is presently in wide use is capable of playing back the CD layer 101 for the user to enjoy the CD data, and a CD player or the like, combined with a decoder for the HD data and an optical head for emitting a short-wavelength laser beam, is capable of playing back high-quality music or the like recorded in the HD layer 102.

Therefore, the hybrid disc may be used as a medium that can be played back by CD players that are generally owned by many users and also devices compatible with HD data.

[Multi-layer HD disc]

The multi-layer HD disc is a combination of single-layer HD discs that are physically bonded to each other.

As shown in FIG. 2D, the multi-layer HD disc comprises a multi-layer disc having a first recording layer L1 and a second recording layer L2. Each of these recording layers L1, L2 serves as an HD layer 102 for recording HD data.

Figure 3D:
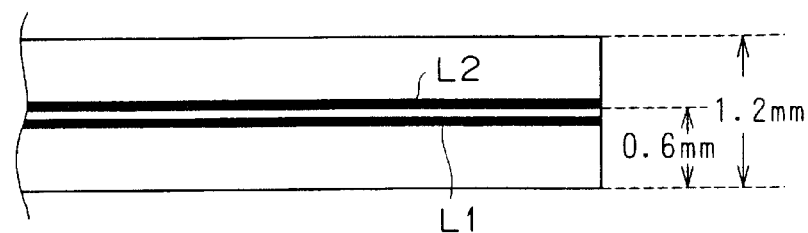
FIG. 3D is a fragmentary cross-sectional view showing the recording layers of the multi-layer HD disc shown in FIG. 2D.

With the multi-layer HD disc, as shown in FIG. 3D, each of the recording layers L1, L2 is formed at a position spaced about 0.6 mm from a disc face (a laser beam entrance surface), i.e., a substantially central position along the thickness of the disc.

Since the multi-layer HD disc serves as a medium for recording audio data as HD data it can reproduce sounds higher in quality than the CD-DA. The multi-layer HD disc provides a recording capacity which is twice the recording capacity of the single-layer HD disc.

2. Structure of the Playback Apparatus

Figure 4:
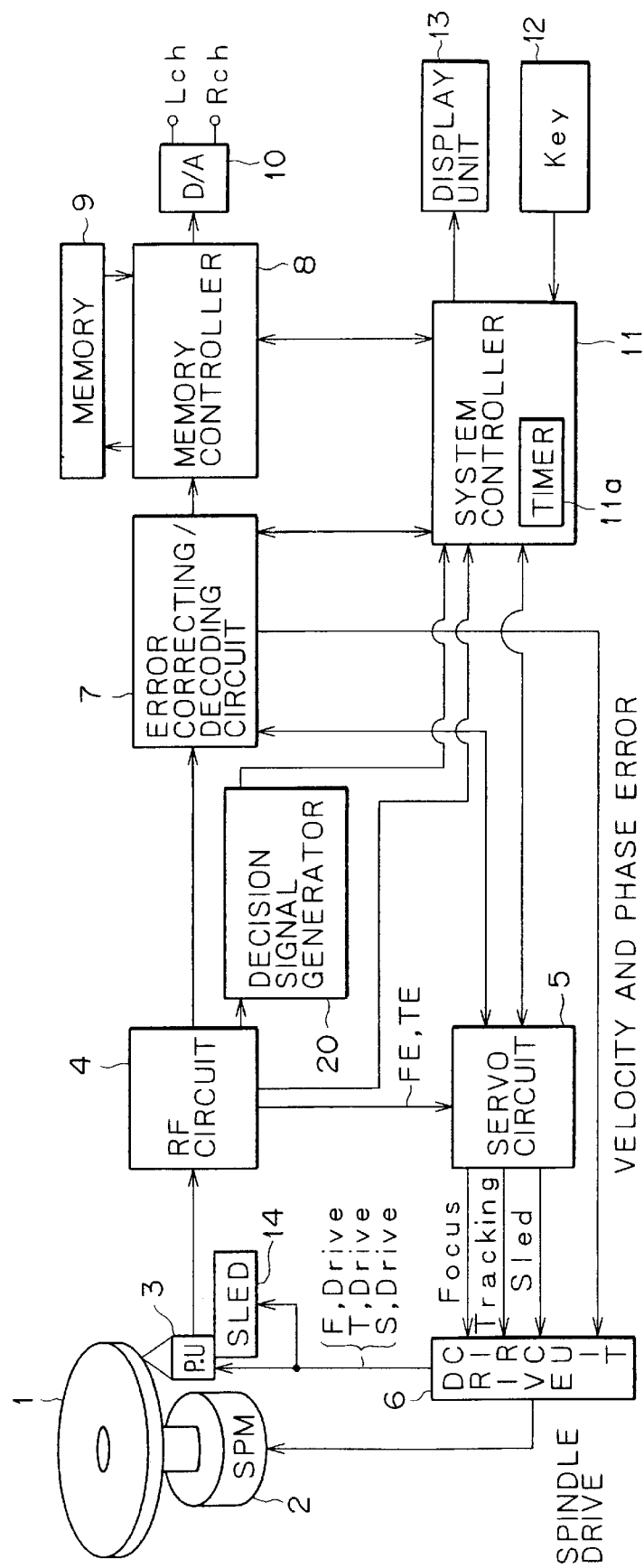
FIG. 4 is a block diagram of a playback apparatus according to an embodiment of the present invention.

A playback apparatus according to this embodiment which is capable of playing back the above disks of the four types is shown in block form in FIG. 4.

An optical disc 1 loaded in the playback apparatus is any one of the above disks of the four types.

The optical disc 1 is placed on a turntable (not shown) and rotated at a CLV (constant linear velocity) or a CAV (constant angular velocity) by a spindle motor 2.

Figure 5:
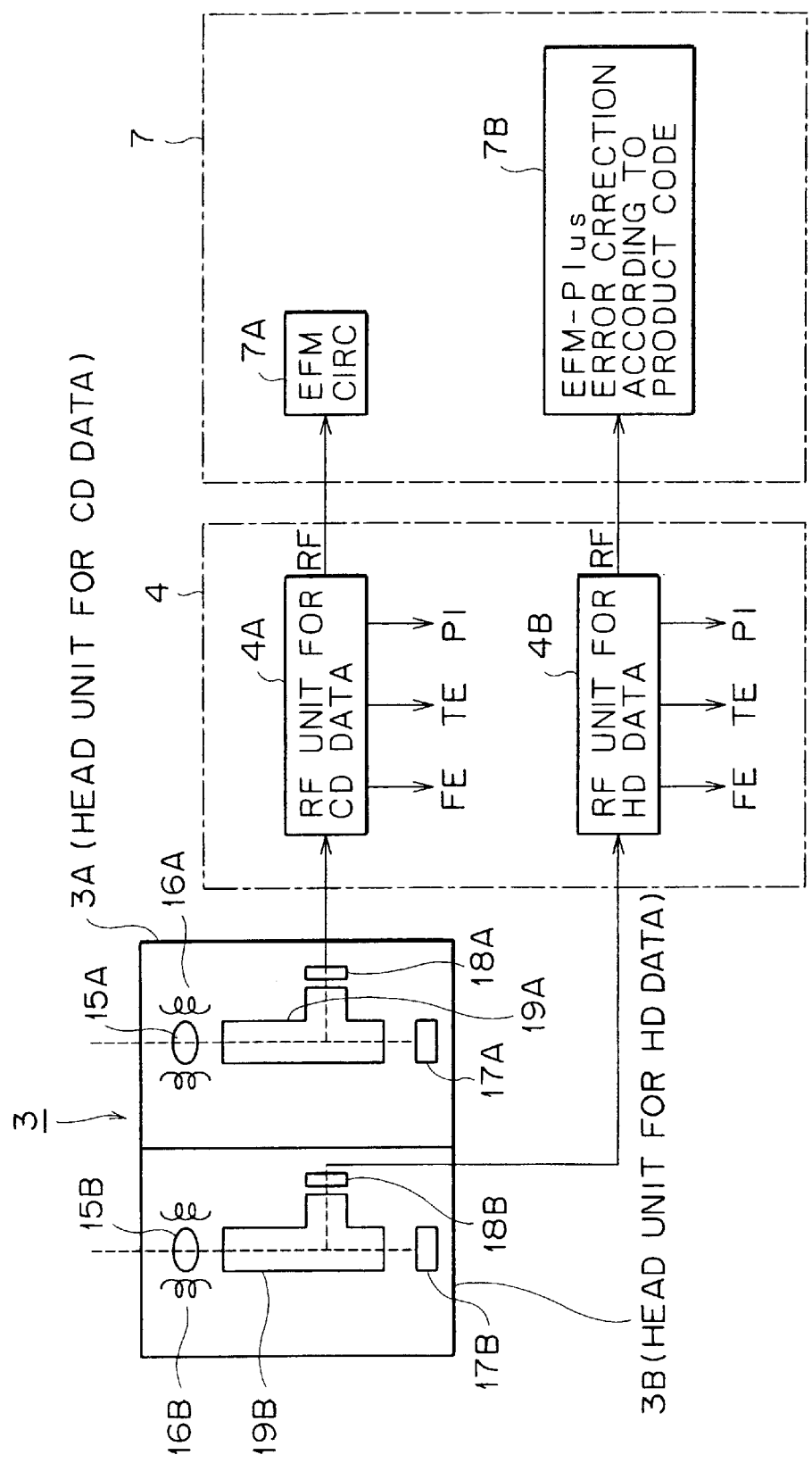
FIG. 5 is a detailed block diagram of the playback apparatus according to the embodiment of the present invention.

In order to be compatible with the disks of the four types, the playback apparatus is required to have a playback function for both the CD layer 101 and the HD layer 102. Each of an optical head 3, an RF amplifier 4, and an error correcting/decoding circuit 7 shown in FIG. 4 has two systems including a CD data playback system and an HD data playback system. These two systems are shown in FIG. 5. In this, embodiment, the CD data playback system and the HD data playback system are described as mutually independent systems. However, the CD data playback system and the HD data playback system actually have many common components, as described later on.

The optical head 3 shown in FIG. 4 has an objective lens, a two-axis mechanism, a semiconductor laser, an optical system for a laser beam emitted by the semiconductor laser and a light beam reflected by the optical disc 1, and a detector for detecting the reflected light beam.

Specifically, as shown in FIG. 5, the optical head 3 has a head unit 3A for CD data and a head unit 3B for HD data which have respective objective lenses 15A, 15B, respective two-axis mechanisms 16A, 16B, respective semiconductor lasers 17A, 17B, respective detectors 18A, 18B, and respective optical systems 19A, 19B.

If the optical disc placed on the turntable is a CD-DA or the CD layer 101 of a hybrid disk is to be played back, then the head unit 3A for CD data is used. The semiconductor laser 17A emits a laser beam having a wavelength of 780 nm, and the objective lens 15A has a numerical aperture of 0.45.

If the optical disc placed on the turntable is a single-layer HD disc or a multi-layer HD disc or the HD layer 102 of a hybrid disk is to be played back, then the head unit 3B for HD data is used. The semiconductor laser 17B emits a laser beam having a; wavelength of 650 nm, and the objective lens 15B has a numerical aperture of 0.6.

The laser beam emitted from the head unit 3A for CD data or the head unit 3B for HD data is applied to the optical disc 1 that is being rotated by the spindle motor 2, and a reflected light beam from the optical disc 1 is received by the detector 18A or 18B.

If a hologram-combined a spherical lens is used, then it is not necessary to provide two objective lenses (15A, 15B) in the optical head 3, but an optical head constructed of a single lens and selectable optical paths for semiconductor lasers may be used. With this modification, two semiconductor lasers for emitting laser beams of shorter and longer wavelengths are provided, with an optical system (objective lens) and a detector being shared.

It is also possible to provide an optical head 3 having semiconductor lasers and optical lenses for CD and HD data, with an optical system and a detector being shared.

The objective lenses 15A, 15B are supported respectively by the two-axis mechanisms 16A, 16B which comprise focusing coils for moving the objective lenses 15A, 15B in directions toward and away from the optical disc 1, and tracking coils for moving the objective lenses 15A, 15B radially across the optical disc 1.

The playback apparatus also has a sled mechanism 14 for moving the optical head 3 in its entirety by a large distance radially across the optical disc 1.

A reflected light beam detected by the detector (18A or 18B) in the optical head 3 is converted into a current signal depending on the quantity of the reflected light beam. The current signal is supplied to the RF amplifier 4, which converts the current signal into a voltage signal and effects matrix calculations on the voltage signal to generate a focus error signal FE, a tracking error signal TE, an RF signal representing reproduced information, and a PI (pull-in) signal as a sum signal.

If the detectors 18A, 18B are provided independently of each other as shown in FIG. 5, then the RF amplifier 4 has an RF unit 4A for CD data and an RF unit 4B for HD data, each of which generates a focus error signal FE, a tracking error signal TE, an RF signal, and a PI signal.

If a detector is shared by the two systems or output signals from the detectors 18A, 18B are selectively supplied to the RF amplifier 4, then it is not necessary to provide the RF unit for CD data and the RF unit for HD data independently of each other.

The focus error signal FE and the tracking error signal TE which are generated by the RF amplifier 4 are compensated for phase and adjusted in gain by a servo circuit 5, and then supplied to a drive circuit 6, which applies a focus drive signal and a tracking drive signal to the focusing coil and the tracking coil.

The tracking error signal TE is also processed by a LPF (low-pass filter) in the servo circuit 5 to generate a sled error signal, which is then applied from the drive circuit 6 as a sled drive signal to the sled mechanism 14.

The focus drive signal, the tracking drive signal, and the sled drive signal thus applied perform a focus servo control process, a tracking servo control process, and a sled servo control process, respectively.

Based on an instruction from a system controller 11, the servo circuit 5 supplies signals for focus searching operation and track jumping operation to the drive circuit 6, which accordingly generates a focus drive signal, a tracking drive signal, and a sled drive signal to cause the optical head 3 to perform focus searching, track jumping and accessing, etc.

The focus searching is an operation for forcibly moving the objective lens 15 (15A, 15B) between a farthest position and a closest position for focus servo pull-in for detecting a so-called just focus point. As well known in the art, the focus error signal FE represents an S-shaped curve in a small interval across a position where the objective lens 15 is focused on the recording layer of the disc 1. When the focus servo control process is:turned on in a linear area of the S-shaped curve, it is possible to effect the focus servo pull-in. The focus searching is carried out for the focus servo pull-in, and the focus drive signal for the focus searching is applied to the focusing coil to move the objective lens 15.

For track jumping and accessing, the two-axis mechanism 16 (16A, 16B) moves the objective lens 15 radially across the disc, and the sled mechanism 14 moves the optical head 3 radially across the disc. Drive signals for such track jumping and accessing are applied as a tracking drive signal and a sled drive signal to the tracking coil and the sled mechanism 14.

If the optical disc 1 placed on the turntable is a CD-DA or the CD layer 101 of a hybrid disk is played back, then the RF signal generated by the RF amplifier 4 is converted into a binary signal, subjected to an EFM (Eight to Fourteen Modulation) demodulation process, and error-corrected according to CIRC (Cross Interleave Reed-Solomon Coding) by the error correcting/decoding circuit 7, after which the processed signal is supplied to a memory controller 8.

If the optical disc 1 placed on the turntable is a single-layer HD disc or a multi layer HD disc or the HD layer 102 of a hybrid disk is played back, then the RF signal generated by the RF amplifier 4 is converted into a binary signal, subjected to an EFM-Plus (Eight to Fourteen Modulation Plus) demodulation process, and error-corrected according to a product code by the error correcting/decoding circuit 7, after which the processed signal is supplied to a memory controller 8.

As shown in FIG. 5, the error correcting/decoding circuit 7 as functionally analyzed has a decoder unit 7A for CD data and a decoder unit 7B for HD data.

The decoder unit 7A for CD data and a decoder unit 7B for HD data may include circuits which are independent from each other in terms of hardware, or may include a common circuit in terms of hardware.

The error correcting/decoding circuit 7 compares the binary EFM signal or the binary EFM-Plus signal with a reference clock signal to generate a velocity error signal and a phase error signal, and supplies the velocity error signal and the phase error signal to the drive circuit 6 for rotating the optical disc 1 at a certain CLV or CAV with the spindle motor 2.

The error correcting/decoding circuit 7 also controls PLL (Phase-Locked Loop) pull-in operation based on the binary EFM signal or the binary EFM-Plus signal to obtain a playback clock signal for use in a decoding process, etc.

The error-corrected binary data is written into a buffer memory 9 at a certain transfer rate by the memory controller 8.

When a predetermined amount of data is stored in the buffer memory 9, the stored data is read from the buffer memory 9 at a second transfer rate that is sufficiently lower than the transfer rate for writing.

As described above, the data is once stored in the buffer memory 9 and then outputted as audio data therefrom. Consequently, even if continuous data readout from the optical head 3 is interrupted by a track jump due to disturbance such as vibrations or the like, because the data corresponding to a period of time required to position the optical head 3 again at an address subjected to the track jump is stored in the buffer memory 9, continuous audio data can be outputted.

The memory controller 8 is controlled by the system controller 11.

The digital data read from the buffer memory 9 by the memory controller 8 is converted by a D/A converter 10 into an analog audio signal, which is outputted as a right-channel output signal and a left-channel output signal.

In the playback apparatus, either one of the signals (PI signal, the focus error signal FE, the tracking error signal TE) generated by the RF amplifier 4 based on the reflected-light information from the detector 18B in the HD head unit 3B (or a detector shared by the HD and CD head units) is supplied to a decision signal generator 20, which detects a peak and outputs a detected-peak signal to the system controller 11. The detected-peak signal supplied to the system controller 11 enables the system controller 11 to operate to determine the type of the loaded disc 1, as described later on.

The system controller 11 include a microcomputer for controlling the playback apparatus as a whole.

The system controller 11 performs a predetermined control process for playback operation according to an operation program stored in an internal ROM and commands from the user.

For example, in response to operation of various command keys of a command unit 12, the system controller 11 transfers commands of various servo processes to the servo circuit 5. The system controller 11 supplies instructions for controlling the buffer memory 9 to the memory controller 8, and enables the error correcting/decoding circuit 7 to perform a spindle motor servo control process and a decoder control process for carrying out necessary playback operation.

Furthermore, the system controller 11 controls a display unit 13 to display images in playback operation or the like. For example, the system controller 11 controls the display unit 13 to display character information representing an elapsed time of the music being performed, the title of a program, etc.

When the optical disc 1 is loaded, the objective lens is moved in substantially the same manner as in the focus searching, and a signal generated from the decision signal generator 20 at this time is checked to determine the type of the optical disc 1. The system controller 11 controls such objective lens movement and disc type determining operation. A timer 11a is used in the disc type determining operation.

Based on the determined result, the system controller 11 controls switching between the CD and HD systems in the optical head 3 and the error correcting/decoding circuit 7, and also controls the setting of servo coefficients.

3. First Process of Disc Determining Operation

Various processes of disc type determining operation at the time the disc 1 is loaded will be described below.

These processes of disc type determining operation may employ the PI signal, the focus error signal FE, and the tracking error signal TE for use in the determining process, and will successively be described as first, second, and third processes of disc determining operation.

The first process of disc determining operation in which the PI signal is used to determine the type of an optical disc will be described be low.

Figure 6:
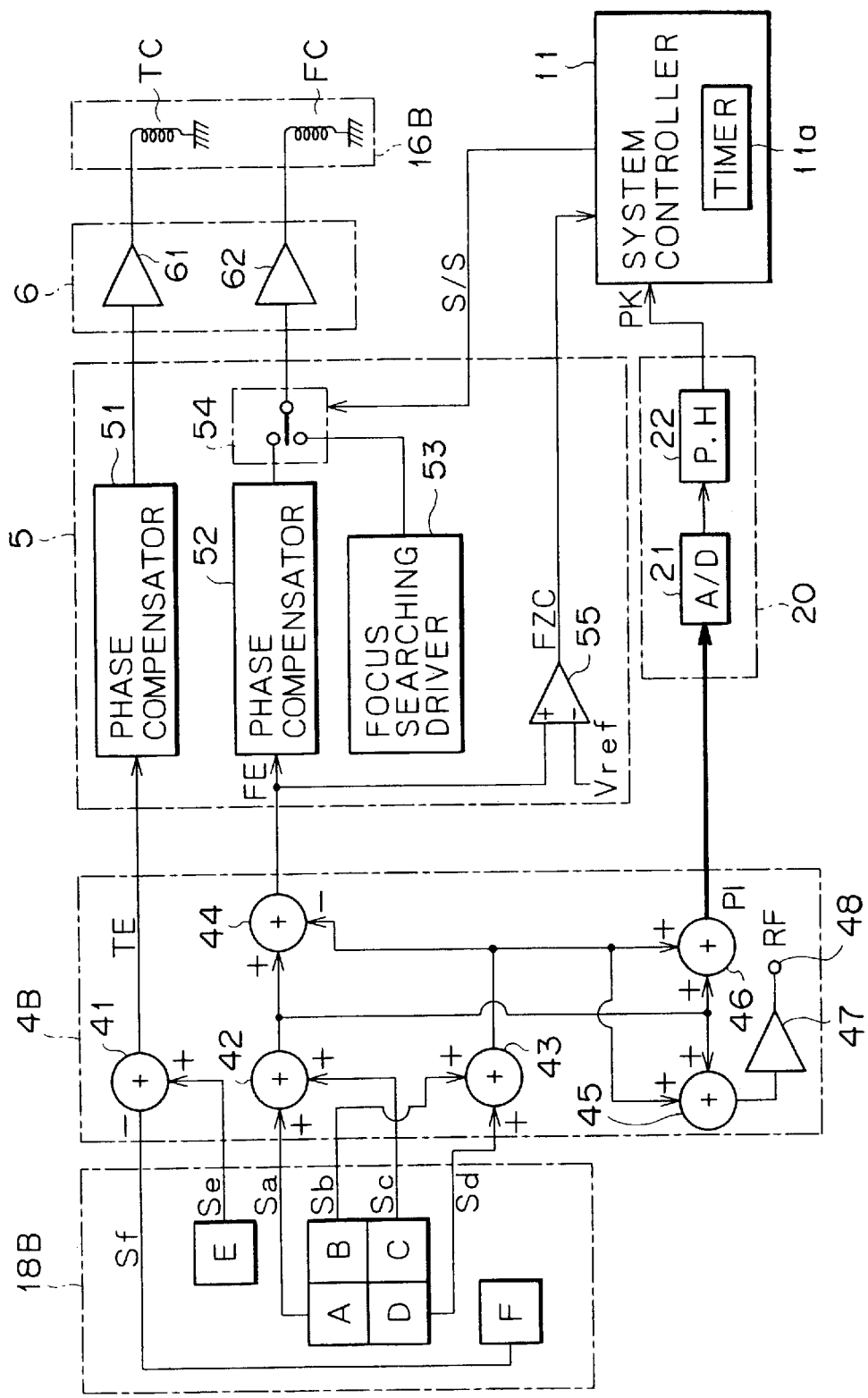
FIG. 6 is a block diagram of a circuit arrangement for carrying out a first process of disc determining operation which employs a PI signal.

A circuit arrangement required to perform the first process of disc determining operation is shown in FIG. 6.

FIG. 6 illustrates circuit blocks shown in FIGS. 4 and 5 which are required in the disc determining operation.

In the disc determining operation, the HD system in the optical head 3 is used. Specifically, in the arrangement shown in FIG. 5, the HD head unit 3B and the RF unit 4B for HD data are used. While the two independent systems as shown in FIG. 5 are premised for illustrative purposes, if there are components shared by the CD and HD systems, then those shared components are used in the circuit arrangement shown in FIG. 6.

In this embodiment, the HD system is used for the disc determining operation because the shorter-wavelength laser beam is capable of being focused on not only the HD layer 102 in which data are recorded with the shorter-wavelength laser beam but also the CD layer 101 in which data are recorded with the longer-wavelength laser beam. Therefore, the shorter-wavelength laser beam is capable of obtaining the PI signals, the focus error signal, and the tracking error signal as represented by the reflected-light information regardless of the disc type and the recording layer.

As shown in FIG. 6, the detector 18B corresponding to the shorter-wavelength semiconductor laser 17B in the optical head 3 includes a four-segment photodetector having four detecting surfaces A, B, C, D for a main spot and a photodetector having detecting surfaces E, F for side spots.

The detecting surfaces A–F output respective signals Sa, Sb, Sc, Sd, Se, Sf representing currents depending on the quantities of light detected thereby.

The signals Sa, Sb, Sc, Sd, Se, Sf are converted by the RF unit 4B for HD data (current-to-voltage converters are omitted from illustration) into respective voltage signals Sa, Sb, Sc, Sd, Se, Sf, which are processed to generate various signals.

Specifically, an adder 42 adds the signals Sa, Sc to produce a sum signal (Sa+Sc), an adder 43 adds the signals Sb, Sd to produce a sum signal (Sb+Sd), and a subtractor 44 subtracts the sum signal (Sb+Sd) from the sum signal (Sa+Sc) to produce a differential signal ((Sa+Sc)−(Sb+Sd)), which is outputted as a focus error signal FE according to astigmatic focusing.

A subtractor 41 subtracts the signal Sf from the signal Se to produce a differential signal (Se−Sf), which is outputted as a tracking error signal TE.

An adder 46 adds the signals Sa, Sc, Sb, Sd to produce a sum signal (Sa+Sc+Sb+Sd), which is outputted as a PI signal. An adder 45 adds the signals Sa, Sc, Sb, Sd to produce a sum signal (Sa+Sc+Sb+Sd), which is outputted as an RF signal. Since the RF signal and the PI signal described above are identical to each other, they may be handled as one signal.

The RF signal produced by the adder 45 is amplified by an amplifier 47, and the amplified RF signal is supplied from a terminal 48 to the error correcting/decoding circuit 7.

The tracking error signal TE produced by the subtractor 41 is compensated for phase and adjusted in gain by a phase compensator 51 in the servo circuit 5, and then supplied to a drive amplifier 61 in the drive circuit 6. The drive amplifier 61 applies a tracking drive signal to a tracking coil TC in, the two-axis mechanism 16B.

The focus error signal FE produced by the subtractor 44 is compensated for phase and adjusted in gain by a phase compensator 52 in the servo circuit 5, and then supplied via switch 54 to a drive amplifier 62 in the drive circuit 6. The drive amplifier 62 applies a focus drive signal to a focusing coil FC in the two-axis mechanism 16B.

In the focus searching operation and the disc type determining operation, the system controller 11 controls the switch 54 to be connected to a focus searching driver 53.

The focus searching driver 53 generates a control signal for moving the objective lens in focus searching, i.e., forcibly moving the objective lens 15B from a farthest position and a closes position over the disc in a focus stroke range thereof and supplies the generated control signal to the drive amplifier 62. In the focus searching operation and the disc type determining operation, therefore, a focus drive signal for forcibly moving the objective lens is applied to the focusing coil FC to move the objective lens 15B.

In order to obtain a timing to perform the focus servo pull-in upon focus searching, a focus zero-crossing signal FZC is monitored. The focus error signal FE is supplied to a comparator 55, which compares the focus error signal FE with a reference voltage Vref to generate the focus zero-crossing signal FZC. The generated focus zero-crossing signal FZC is supplied to the system controller 11.

The PI signal produced by the adder 46 is supplied to the system controller 11 for the detection of a timing to perform the focus servo pull-in.

In this embodiment, the PI signal is also supplied to the decision signal generator 20. In the decision signal generator 20, the PI signal is converted by an A/D converter 21 into a digital signal whose peak value is detected by a peak hold circuit 22. A detected peak signal PK is supplied from the peak hold circuit 22 to the system controller 11.

In FIG. 6, the timer 11*a* serves to measure a timing at which the peak value is outputted from the peak hold circuit 22 when the peak value is detected by the peak hold circuit 22 from the digital signal converted from the PI signal by the A/D converter 21.

The principles of operation in which the system controller 11 determines the type of a disc based on a peak value detected from the PI signal by the decision signal generator 20 are illustrated in FIGS. 7A through 7D.

It is assumed that the objective lens 15B is forcibly moved from the farthest position to the closest position over the disc 1 within the focus stroke range. The PI signal has a highest amplitude level when the objective lens 15B is positioned to focus the laser beam on a recording layer of the disc 1.

In FIGS 7A through 7D, the horizontal axis represents the position of the objective lens 15B, and the vertical axis the focused position of the laser beam (the level of the PI signal value). The PI signals shown in FIGS. 7A through 7D are generated if the disc 1 is the CD-DA, the single-layer HD disc, the hybrid disc, and the multi-layer HD disc, respectively.

Figure 7A:
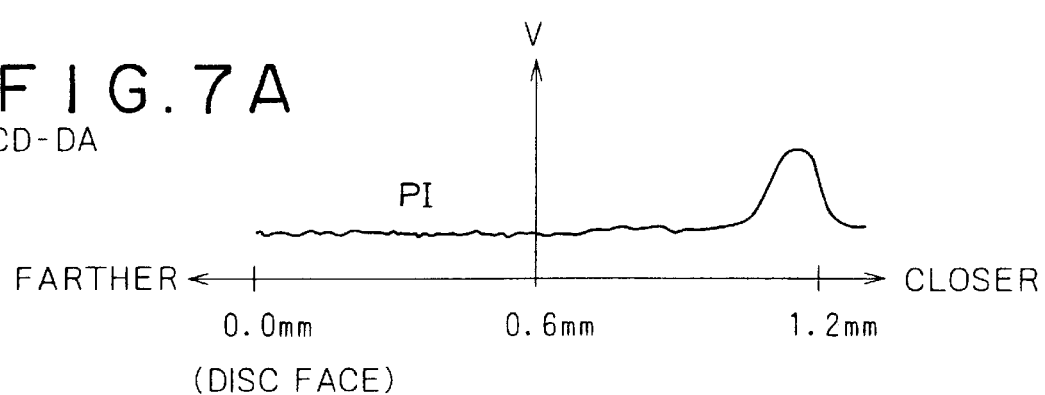
FIG. 7A is a diagram illustrative of a PI signal produced by an RF circuit when a CD-DA is played back.

As shown in FIG. 7A, if the disc 1 is the CD-DA, then the PI signal has an amplitude peak detected when the objective lens 15B is positioned to focus the laser beam near a position that is spaced about 1.2 mm from the disc face, depending on the position at which the recording layer L is formed as shown in FIG. 3A.

Figure 7B:
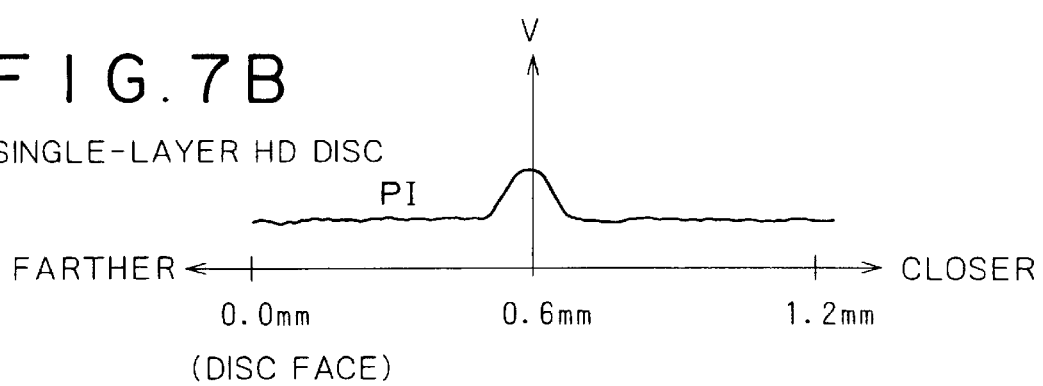
FIG. 7B is a diagram illustrative of a PI signal produced by the RF circuit when a single-layer HD disc is played back.

As shown in FIG. 7B, if the disc 1 is the single-layer HD disc, then the PI signal has an amplitude peak detected when the objective lens 15B is positioned to focus the laser beam near a position that is spaced about 0.6 mm from the disc face, depending on the position at which the recording layer L is formed as shown in FIG. 3B.

Figure 7C:
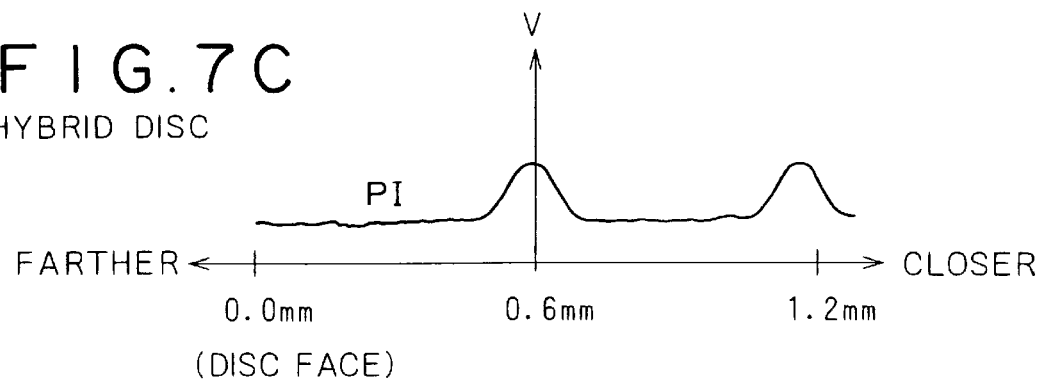
FIG. 7C is a diagram illustrative of a PI signal produced by the RF circuit when a hybrid disc is played back.

As shown in FIG. 7C, if the disc 1 is the hybrid disc, then the PI signal has two amplitude peaks detected when the objective lens 15B is positioned to focus the laser beam near a position that is spaced about 0.6 mm from the disc face, and when the objective lens 15B is positioned to focus the laser beam near a position that is spaced about 1.2 mm from the disc face, depending on the positions at which the recording layers L1, L2 are formed as shown in FIG. 3C.

Figure 7D:
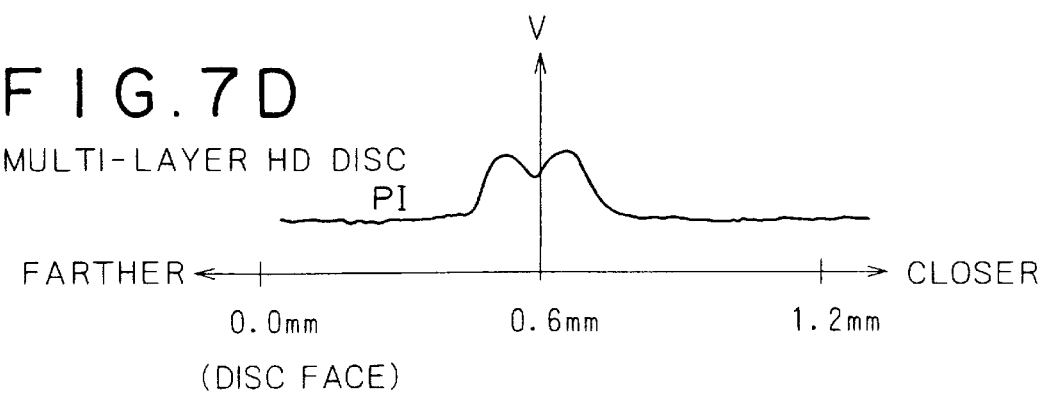
FIG. 7D is a diagram illustrative of a PI signal produced by the RF circuit when a multi-layer HD disc is played back.

As shown in FIG. 7D, if the disc 1 is the multi-layer HD disc, then the PI signal has two amplitude peaks detected when the objective lens 15B is positioned to focus the laser beam near a position that is spaced about 0.6 mm from the disc face, depending on the positions at which the recording layers L1, L2 are formed as shown in FIG. 3D.

As described above, the type of the disc 1 is determined on the basis of the fact that when the objective lens 15B is forcibly moved within the focus stroke range, the number of observed peaks of the PI signal and the timing of the peaks thereof differ depending on the disc type.

A disc determining process which is carried out by the system controller 11 when a disc is loaded will be described below with reference to FIG. 8.

When the disc 1 is loaded, the system controller 11 executes the disc determining process shown in FIG. 8 before it energizes the spindle motor 2 and performs a servo system start-up process.

Specifically, when the disc 1 is loaded and before the spindle motor 2 is energized, i.e., when the disc 1 is not yet rotated, the system controller 11 executes the disc determining process.

While the disc determining process is being carried out, the head unit 3B for HD data is used in the optical head 3. The optical head 3 is positioned near the innermost circumferential area of the disc 1 in the radial direction thereof.

The disc determining process is performed while the disc 1 is not rotating because the disc determining process should not be adversely affected by surface fluctuations of the disc 1 during rotation thereof.

The disc determining process is performed while the optical head 3 is being positioned near the innermost circumferential area of the disc 1 because the effect of any curvatures of the disc 1 is minimum at the innermost circumferential area of the disc 1. Another advantage obtained when the optical head 3 is positioned near the innermost circumferential area of the disc 1 is that a start-up process subsequent to the disc determining process (particularly, a TOC reading process) can smoothly be initiated.

In this state (before the disc 1 starts rotating and the optical head 3 is positioned near the innermost circumferential area of the disc 1), the system controller 11 moves the objective lens 15B of the optical head 3 to a position farthest from the disc 1 within its focus stroke range in step F101. In step F102, the system controller 11 forcibly moves the objective lens 15B in a search mode from the farthest position toward the disc 1. In steps F101, F102, therefore, the system controller 11 connects the switch 54 shown in FIG. 6 to the focus searching driver 53, and controls the focus searching driver 53 to output a drive signal for moving the objective lens 15B in the same manner as in focus searching.

When the objective lens 15B starts moving in the search mode in step F102, the system controller 11 controls the semiconductor laser 17B to start to emit a laser beam, and starts observing a peak value, detected by the decision signal generator 20, of the PI signal obtained as reflected-light information from the laser beam. When the system controller 1 starts observing a peak value, the system controller 1 starts measuring time with the timer 11*a*.

After the objective lens 15B starts moving in the search mode and a peak value of the PI signal starts being observed while the objective lens 15B is moving in step F102, the system controller 11 continuously moves the objective lens 15B and observes a peak value, and waits for the movement of the objective lens 15B in the search mode to be completed in step F103. Stated otherwise, the system controller 11 waits until the objective lens 15B moves mostly closely to the disc 1.

When the movement of the objective lens 15B in the search mode is completed, the system controller 11 decides, for branched processing, whether a peak value is detected at one point or two points in step F104.

If a peak value is detected at one point while the objective lens is being moved in the focus stroke range, then the PI signal has its waveform as shown in FIGS. 7A and 7B, i.e., the disc 1 has one recording layer, i.e., the disc 1 is the CD-DA or the single-layer HD disc.

If a peak value is detected at one point, control goes to step F106. In step F106, the system controller 11 decides whether the timing to observe the peak value is the timing for the objective lens 15B to be positioned to focus the laser beam near a position that is spaced about 0.6 mm from the disc face, or not.

The timing to observe the peak value can be determined by storing the count of the timer 11a at the time the peak value is detected.

Specifically, since the time required for the objective lens 15B to move within the focus stroke range is known, the position of the objective lens 15B at the time the peak value is detected can be calculated from the count of the timer 11a at the time the peak value is detected. Stated otherwise, the time required for the objective lens 15B to move within the focus stroke range depends on the waveform of the search control signal from the focus searching driver 53.

If the timing of the detected peak value is the same as the timing for the objective lens 15B to be positioned to focus the laser beam near a position that is spaced about 0.6 mm from the disc face, then the PI signal shown in FIG. 7B is observed, and hence the disc 1 is determined as the single-layer HD disc in step F109.

If not in step F106, then the timing of the detected peak value is the same as the timing for the objective lens 15B to be positioned to focus the laser beam near a position that is spaced about 1.2 mm from the disc face. Therefore, the PI signal shown in FIG. 7A is observed, and hence the disc 1 is determined as the CD-DA in step F110.

If a peak value is detected at two points while the objective lens is being moved within the focus stroke range in step F104, then the PI signal has its waveform as shown in FIGS. 7C and 7D, i.e., the disc 1 has two recording layer, i.e., the disc 1 is the hybrid disc or the multi-layer HD disc.

Control proceeds to step F105 in which the system controller 11 decides whether either one of the timings of the peak values is the same as the timing for the objective lens 15B to be positioned to focus the laser beam near a position that is spaced about 0.6 mm from the disc face, or not.

If either one of the two timings of the peak values is the same as the timing for the objective lens 15B to be positioned to focus the laser beam near a position that is spaced about 0.6 mm from the disc face, then the PI signal shown in FIG. 7D is observed, and hence the disc 1 is determined as the multi-layer HD disc in step F107.

If not in step F105, then the two timings of the peak values are the same as the timing for the objective lens 15B to be positioned to focus the laser beam near a position that is spaced about 0.6 mm from the disc face and the timing for the objective lens 15B to be positioned to focus the laser beam near a position that is spaced about 1.2 mm from the disc face. Therefore, the PI signal shown in FIG. 7C is observed, and hence the disc 1 is determined as the hybrid disc in step F108.

In this embodiment, as described above, the objective lens 15B is moved in the search mode after the disc 1 is loaded, and during the movement of the objective lens 15B, the number and positions of peak values of the PI signal are observed to determine one of the four types of discs.

The time required to determine the type of a disc is equal to the time required to move the objective lens 15B in one stroke, and processes of energizing or settling the spindle motor and settling the servo system are not required. Therefore, the determination of a disc can quickly be completed after the disc is loaded.

Since a disc is determined using the PI signal, no dedicated sensor is needed for the determination of the disc.

Though not shown in the flowchart of FIG. 8, if no peak value is observed while the objective lens is being moved in the search mode, or if a peak value is observed at three points or more, or if a peak value is observed at a timing different from the timing corresponding to the position spaced about 0.6 mm or 1.2 mm from the disc face, then it is preferable to retry the disc determining operation because some observation error may have possibly occurred.

Figure 9:
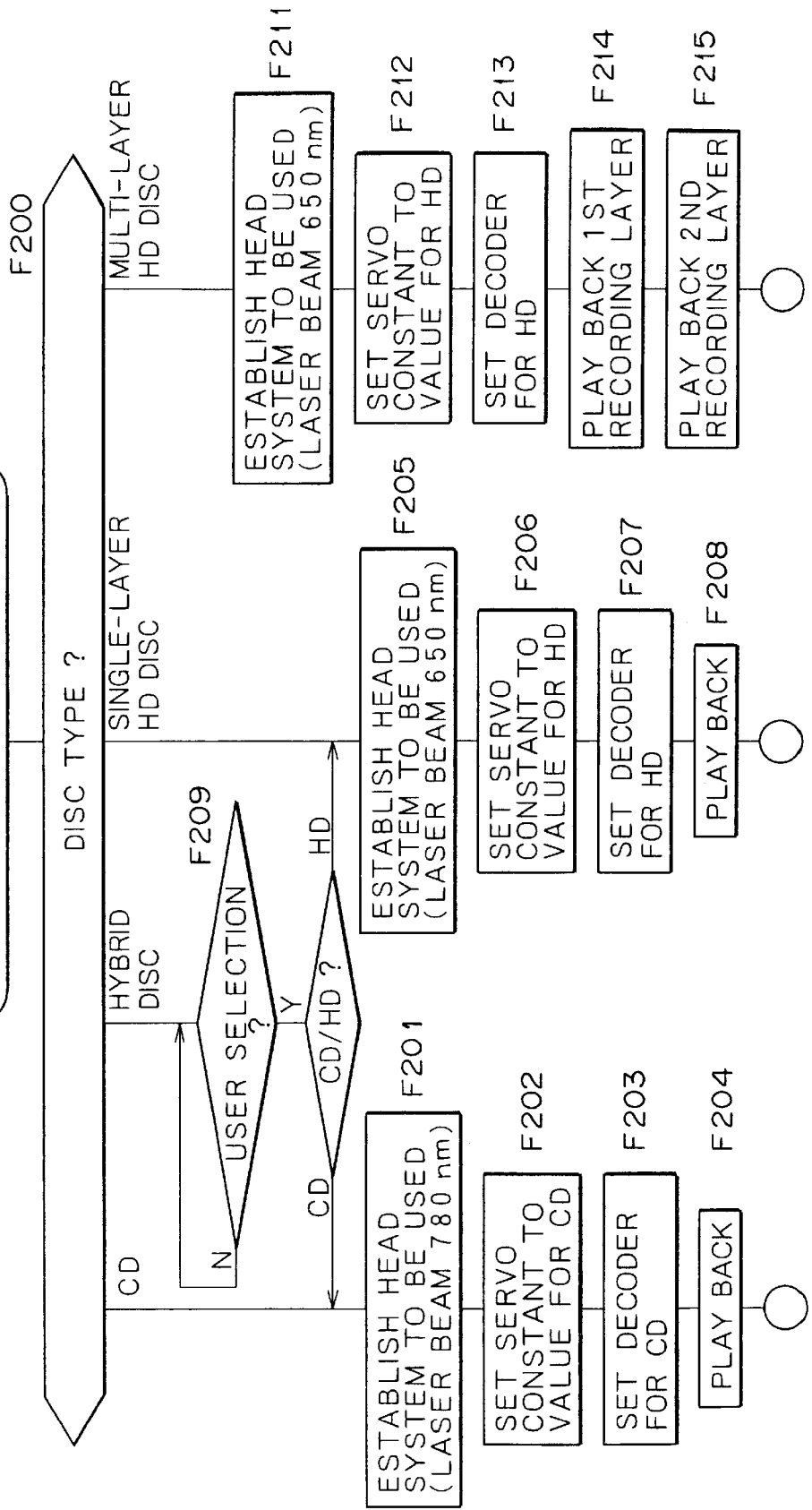
FIG. 9 is a flowchart of a process subsequent to the disc determining process of the playback apparatus according to the embodiment of the present invention.

After the completion of the above disc determining operation, the system controller 11 performs a process of playing back the disc 1, as shown in FIG. 9.

The system controller 11 determines a disc type for branched processing in step F200.

If the disc 1 is the CD-DA, then the system controller 11 establishes an optical head system to be used in step F201. That is, the system controller 11 selects the head unit 3A for CD data as an optical head system to be used. In step F202, the system controller 11 sets a servo constant (servo gain, etc.) in the servo circuit 5 to a value corresponding to the CD layer.

In step F203, the system controller 11 sets the decoder unit 7A for CD data to function in the error correcting/decoding circuit 7.

After the completion of the settings for the CD-DA, the system controller 11, either automatically or in response to a playback command from the user, carries out a start-up operation, i.e., energizes and settles the spindle motor, pulls in the servo system, and reads TOC (Table of Contents) data, after which an actual playback operation is started, in step F204.

If the disc 1 is determined as the single-layer HD disc, then the system controller 11 selects the head unit 3B for HD data as an optical head system to be used in step F205.

In step F206, the system controller 11 sets a servo constant (servo gain, etc.) in the servo circuit 5 to a value corresponding to the HD layer.

In step F207, the system controller 11 sets the decoder unit 7B for HD data to function in the error correcting/decoding, circuit 7.

After the completion of the settings for the HD, the system controller 11, either automatically or in response to a playback command from the user, carries out a start-up operation, i.e., energizes and settles the spindle motor, pulls in the servo system, and reads TOC data, after which an actual playback operation is started, in step F208.

If the disc 1 is determined as the multi-layer HD disc, then the system controller 11 selects the head unit 3B for HD data as an optical head system to be used in step F211.

In step F212, the system controller 11 sets a servo constant (servo gain, etc.) in the servo circuit 5 to a value corresponding to the HD layer.

In step F213, the system controller 11 sets the decoder unit 7B for HD data to function in the error correcting/decoding circuit 7.

After the completion of the settings for the HD, the system controller 11, either automatically or in response to a playback command from the user, carries out a start-up operation, i.e., energizes and settles the spindle motor, pulls in the servo system, and reads TOC data, after which an actual playback operation is started.

Usually, however, the system controller 11 effects a start-up process and a playback process for the first recording layer in step F214.

Unless there is a certain command (stop or access command) from the user, the system controller 11 plays back the second recording layer in step F215 after the playback of the first recording layer is completed.

If the disc 1 is determined as the hybrid disc, the same data of music or the like are recorded in the first recording layer and the second recording layer. That is, the same contents of music or the like are recorded as CD data and HD data.

Inasmuch as the playback apparatus is capable of playing back both the CD layer 101 and the HD layer 102, the system controller 11 waits for the user's selection in step F209.

If there is a selection command for playing back the CD data, then control goes to step F201. If there is a selection command for playing back the HD data, then control goes to step F205.

If the disc 1 is determined as the hybrid disc, then the system controller 11 may not wait for the user's selection, but may start playing back one of the layers, e.g., the HD layer 102, preferentially.

As described above, the playback process proceeds depending on the determined disc type. Because the disc is determined quickly and accurately, the process up to the start of the playback process shown in FIG. 9 can be carried out efficiently.

4. Second Process of Disc Determining Operation

The second process of disc determining operation in which the focus error signal FE is used to determine the type of an optical disc will be described below.

Figure 10:
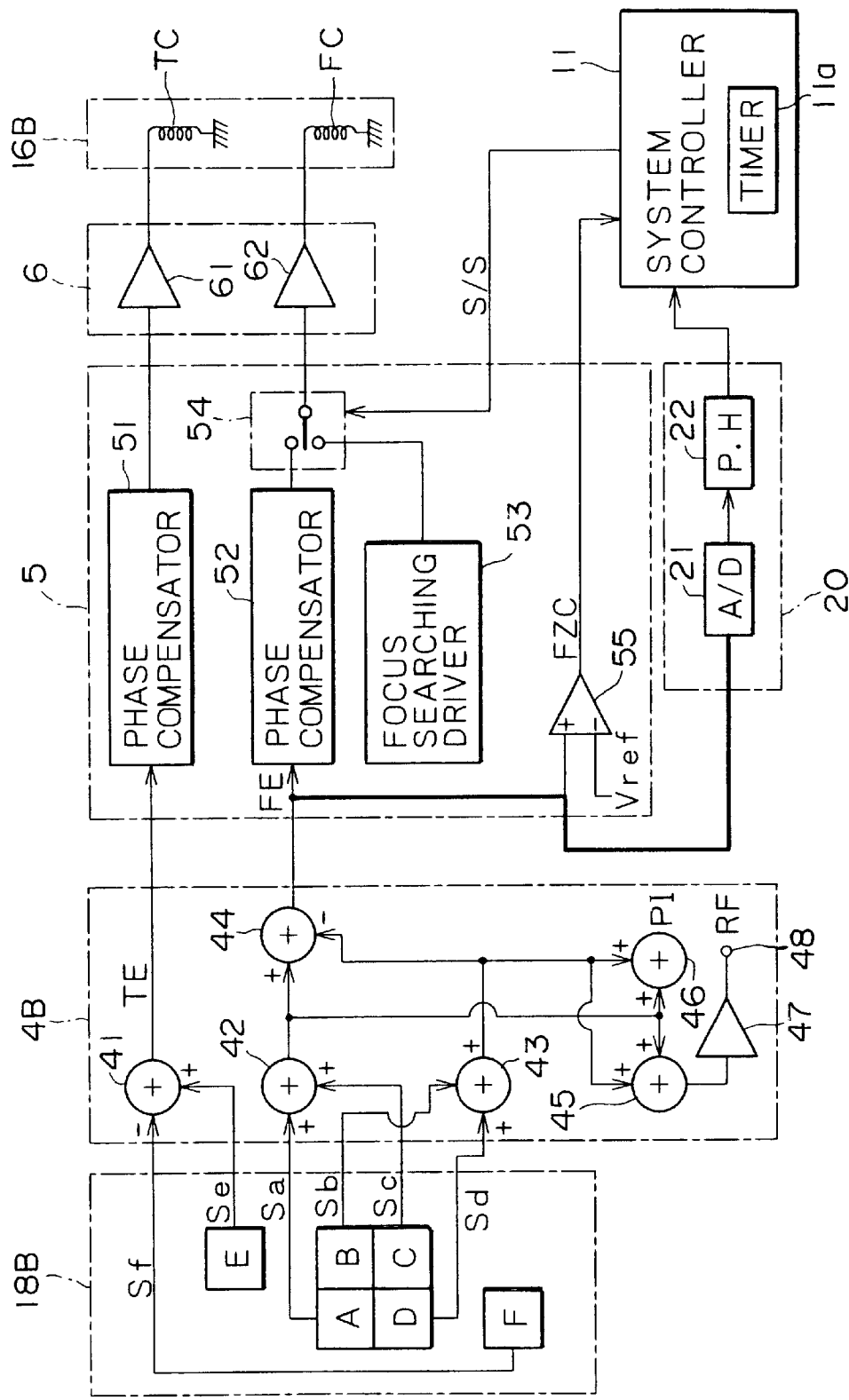
FIG. 10 is a block diagram of a circuit arrangement for carrying out a second process of disc determining operation which employs FE signals.

A circuit arrangement required to perform the second process of ;disc determining operation is shown in FIG. 10. The circuit arrangement shown in FIG. 10 differs from the circuit arrangement shown in FIG. 6 in that the focus error signal FE produced by the subtractor 44 is supplied to the decision signal generator 20, and converted by the A/D converter 21 into a digital signal whose peak value is detected by the peak hold circuit 22.

The peak of the focus error signal FE supplied to the decision signal generator 20 is detected, and the system controller 11 determines the type of the disc based on the detected peak, on substantially the same principles as with the circuit arrangement which employs the PI signal.

FIGS. 11A through 11D show the focus error signal FE in the same manner as shown in FIGS. 7A through 7D.

When the objective lens 15B is forcibly moved in the focus stroke range, the focus error signal FE represents an S-shaped curve which is observed when the objective lens 15B is positioned to focus the laser beam on a recording layer of the disc 1. Stated otherwise, the focus error signal FE has a highest amplitude level in the period of the S-shaped curve.

Figure 11A:
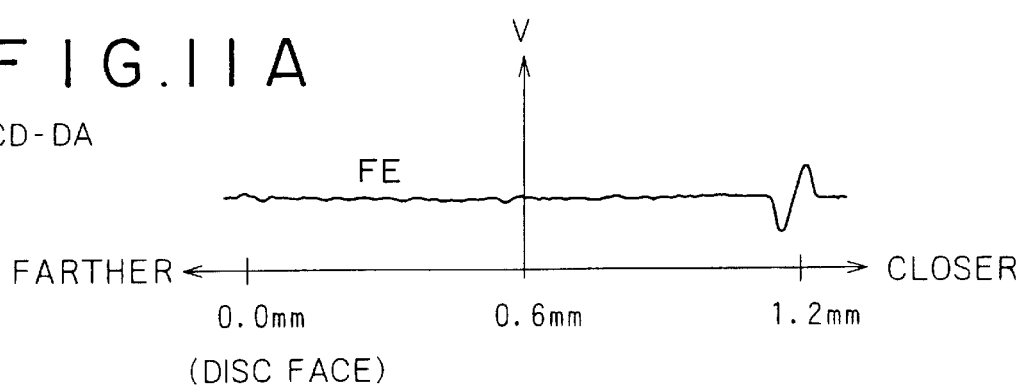
FIG. 11A is a diagram illustrative of an FE signal produced by an RF circuit when a CD-DA is played back.

As shown in FIG. 11A, if the disc 1 is the CD-DA, then the focus error signal FE has an amplitude peak detected when the objective lens 15B is positioned to focus the laser beam near a position that is spaced about 1.2 mm from the disc face.

Figure 11B:
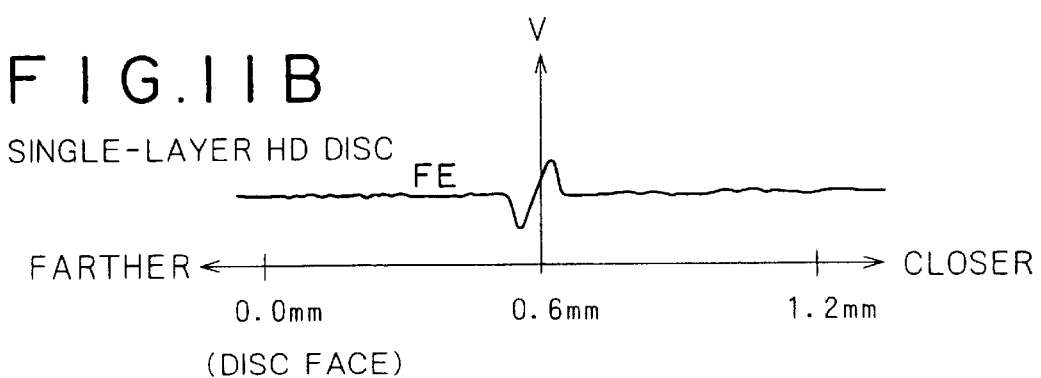
FIG. 11B is a diagram illustrative of an FE signal produced by the RF circuit when a single-layer HD disc is played back.

As shown in FIG. 11B, if tithe disc 1 is the single-layer HD disc, then the focus error signal FE has an amplitude peak detected when the objective lens 15B is positioned to focus the laser beam near a position that is spaced about 0.6 mm from the disc face.

Figure 11C:
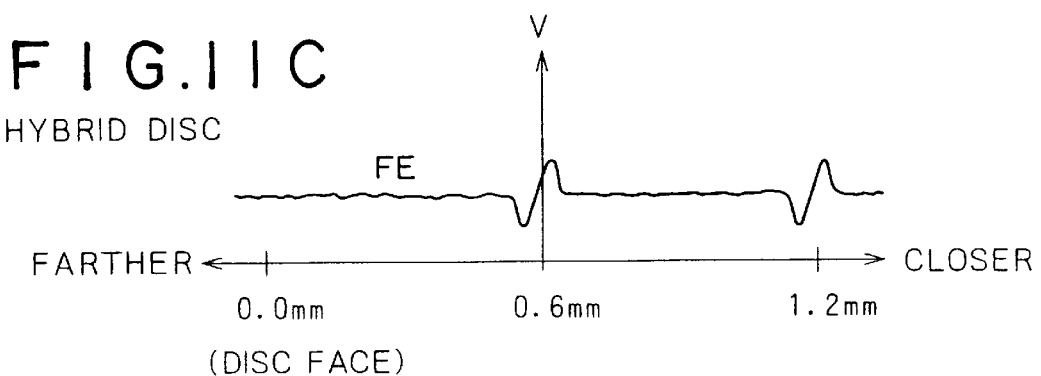
FIG. 11C is a diagram illustrative of an FE signal produced by the RF circuit when a hybrid disc is played back.

As shown in FIG. 11C, if the disc 1 is the hybrid disc, then the focus error signal FE has two amplitude peaks detected when the objective lens 15B is positioned to focus the laser beam near a position that is spaced about 0.6 mm from the disc face, and when the objective lens 15B is positioned to focus the laser beam near a position that is spaced about 1.2 mm from the disc face.

Figure 11D:
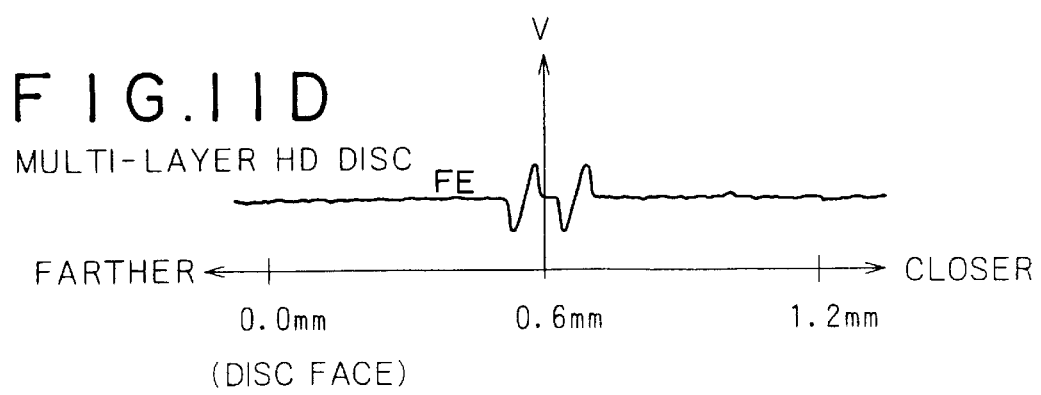
FIG. 11D is a diagram illustrative of an FE signal produced by the RF circuit when a multi-layer HD disc is played back.

As shown in FIG. 11D, if the disc 1 is the multi-layer HD disc, then the focus error signal FE has two amplitude peaks detected when the objective lens 15B is positioned to focus the laser beam near a position that is spaced about 0.6 mm from the disc face.

As described above, the type of the disc 1 is determined by the circuit arrangement shown in FIG. 10 according to the same process as the process employing the PI signal (as shown in FIG. 8), based on the fact that when the objective lens 15B is forcibly moved within the focus stroke range, the number of observed peaks of the focus error signal FE and the timing of the peaks thereof differ depending on the disc type. Therefore, the second process of disc determining operation offers the same advantages as the first process of disc determining operation.

5. Third Process of Disc Determining Operation

The third process of disc determining operation in which the tracking error signal TE is used to determine the type of an optical disc will be described below.

Figure 12:
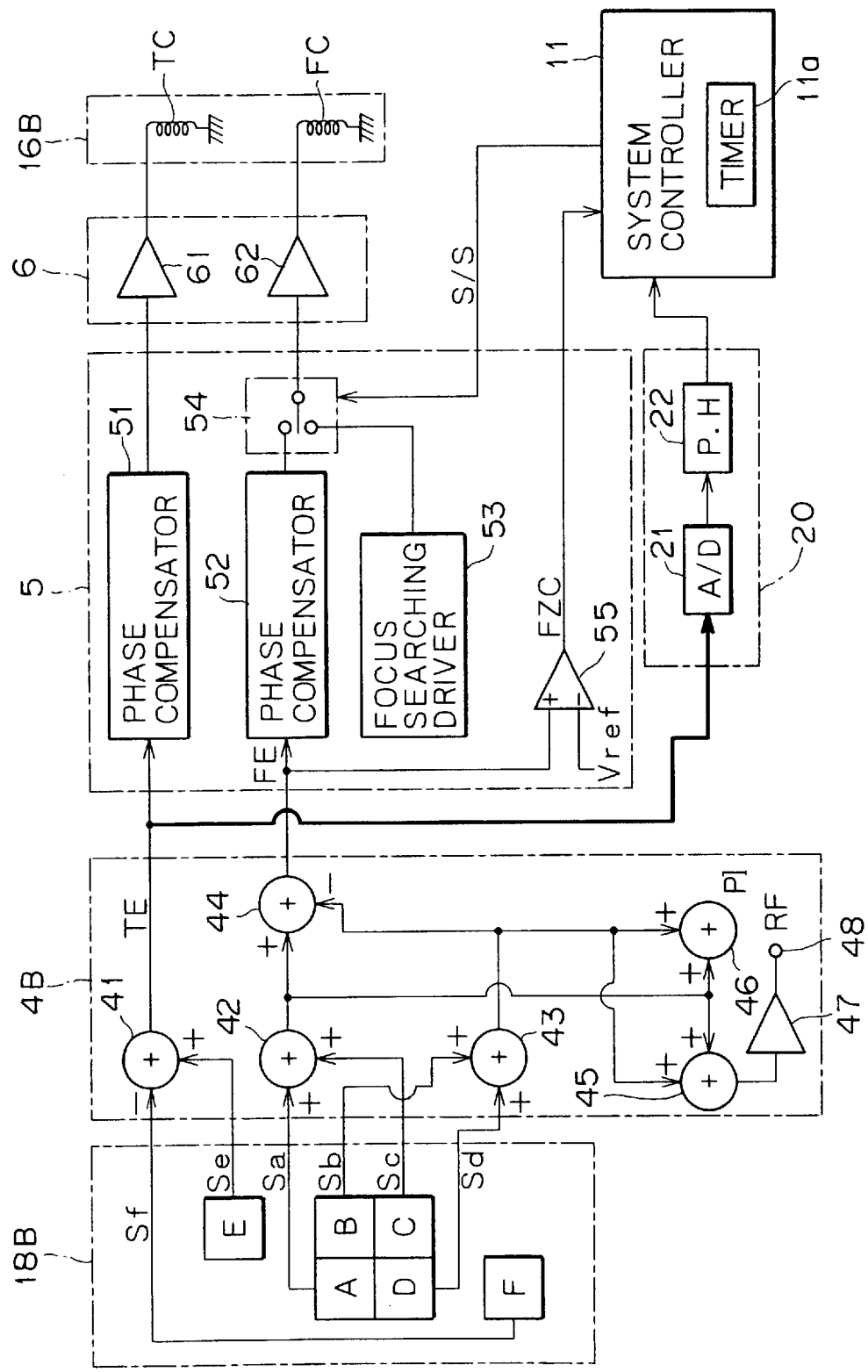
FIG. 12 is a block diagram of a circuit arrangement for carrying out a third process of disc determining operation which employs a TE signal.

A circuit arrangement required to perform the third process of disc determining operation is shown in FIG. 12. The circuit arrangement shown in FIG. 12 differs from the circuit arrangement shown in FIGS. 6 and 10 in that the tracking error signal TE produced by the subtractor 41 is supplied to the decision signal generator 20, and converted by the A/D converter 21 into a digital signal whose peak value is detected by the peak hold circuit 22.

The peak of the tracking error signal TE supplied to the decision signal generator 20 is detected, and the system controller 11 determines the type of the disc based on the detected peak, on substantially the same principles as with the circuit arrangement which employs the PI signal.

FIGS. 13A through 13D show the tracking error signal TE in the same manner as shown in FIGS. 7A through 7D and 11A through 11D.

When the objective lens 15B is forcibly moved in the focus stroke range, the tracking error signal TE has its amplitude observed when the objective lens 15B is positioned to focus the laser beam on a recording layer of the disc 1. When the laser beam is focused on a recording layer, since an appropriate level of reflected light is detected by the detecting surfaces E, F of the detector, some amplitude of the tracking error signal TE is achieved even if the tracking servo is free at the time. Stated otherwise, the tracking error signal TE has a highest amplitude level if the laser beam is focused on a recording layer.

Figure 13A:
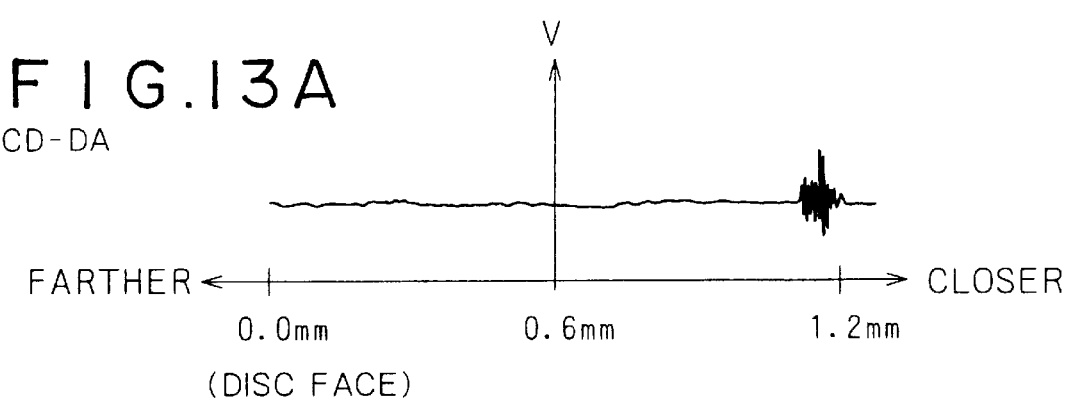
FIG. 13A is a diagram illustrative of a TE signal produced by an RF circuit when a CD-DA is played back.

As shown in FIG. 13A, if the disc 1 is the CD-DA, then the tracking error signal TE has an amplitude peak detected when the objective lens 15B is positioned to focus the laser beam near a position that is spaced about 1.2 mm from the disc face.

Figure 13B:
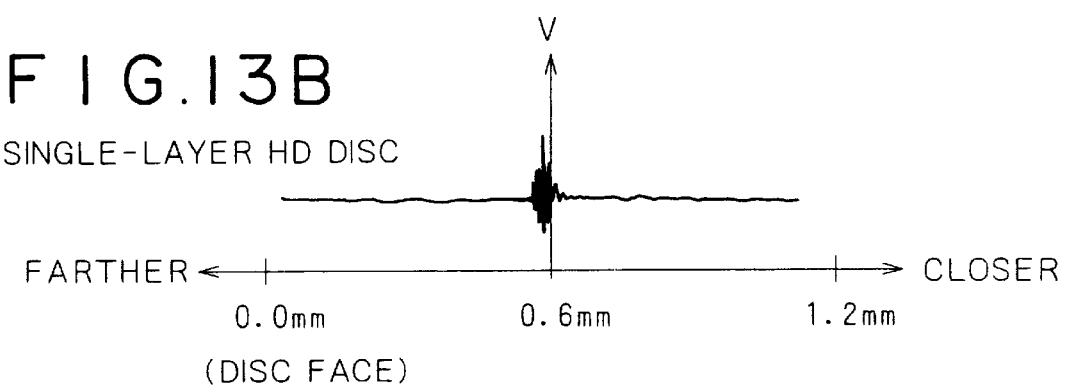
FIG. 13B is a diagram illustrative of a TE signal produced by the RF circuit when a single-layer HD disc is played back.

As shown in FIG. 13B, if the disc 1 is the single-layer HD disc, then the tracking error signal TE has an amplitude peak detected when the objective lens 15B is positioned to focus the laser beam near a position that is spaced about 0.6 mm from the. disc face.

Figure 13C:
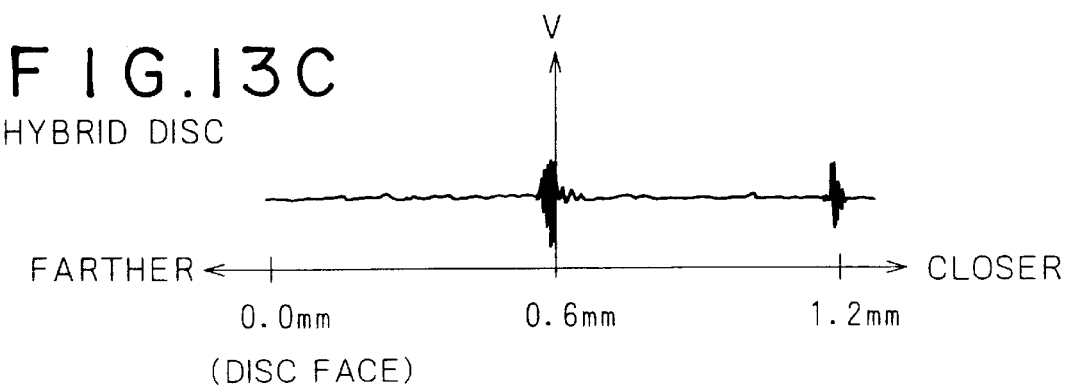
FIG. 13C is a diagram illustrative of a TE signal produced by the RF circuit when a hybrid disc is played back.

As shown in FIG. 13C, if the disc 1 is the hybrid disc, then the tracking error signal TE has two amplitude peaks detected when the objective lens 15B is positioned to focus the laser beam near a position that is spaced about 0.6 mm from the disc face, and when the objective lens 15B is positioned to focus the laser beam near a position that is spaced about 1.2 mm from the disc face.

Figure 13D:
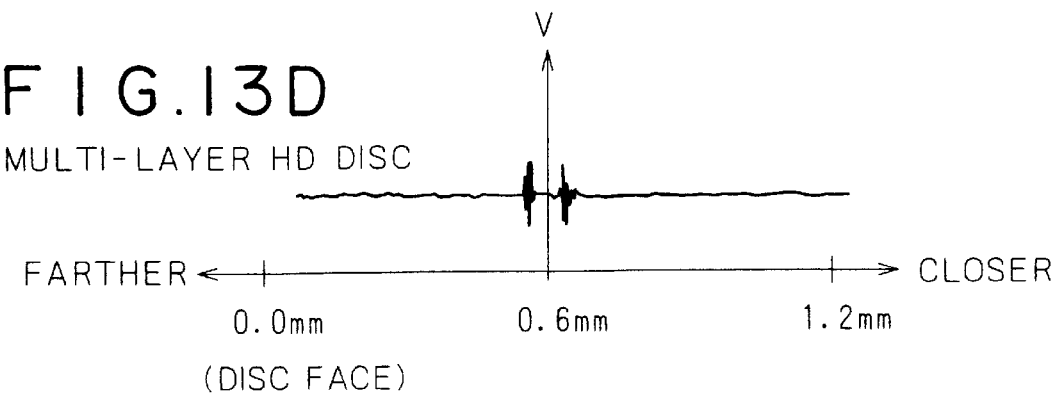
FIG. 13D is a diagram illustrative of a TE signal produced by the RF circuit when a multi-layer HD disc is played back.

As shown in FIG. 13D, if the disc 1 is the multi-layer HD disc, then the tracking error signal TE has two amplitude peaks detected when the objective lens 15B is positioned to focus the laser beam near a position that is spaced about 0.6 mm from the disc face.

As described above, the type of the disc 1 is determined by the circuit arrangement shown in FIG. 12 according to the same process as the process employing the PI signal (as shown in FIG. 8), based on the fact that when the objective lens 15B is forcibly moved within the focus stroke range, the number of observed peaks of the tracking error signal TE and the timing of the peaks thereof differ depending on the disc type. Therefore, the third process of disc determining operation offers the same advantages as the first and second processes of disc determining operation.

6. Modifications

In the embodiment described above, the playback apparatus is compatible with four types of discs.

Actually, however, a simpler playback apparatus compatible with two types of discs, for example, may be provided.

For example, a playback apparatus may be provided which has only an HD data playback system and is compatible with a single-layer HD disc and a multi-layer HD disc. A DVD player without a CD-DA playback function corresponds to such a playback apparatus.

The above playback apparatus may be required to determine only a single-layer HD disc and a multi-layer HD disc.

The process of disc determining operation of the above playback apparatus is simpler in that it may only detect a peak at one point or two points in the process shown in FIG. 8. Specifically, if a peak is detected at one point in step F104, then the disc may be determined as the single-layer HD disc, and if a peak is detected at two points in step F104, then the disc may be determined as the multi-layer HD disc. In this case, therefore, the timing of a peak based on the count of the timer 11a, for example, does not need to be determined.

Furthermore, a playback apparatus may also be provided which has only a CD data playback system and is capable of playing back a CD-DA and the CD layer 101 of a hybrid disc. Such a playback apparatus is able to determine the type of a disc based on only the number of points where a peak value is detected.

In a playback apparatus capable of selectively playing back a CD-DA and a single-layer HD disc, since both discs are single-layer discs, it is not necessary to count the number of peaks, but may detect only the timing at which a peak value is outputted.

In the above embodiment, the PI signal, the focus error signal FE, and the tracking error signal TE are used to determine the type of a disc. However, the RF signal may be used for disc type determination.

Many modifications and applications are possible for the present invention. For example, if a disc having a three or more recording layers is developed, then since a peak value of a PI signal or the like is detected at a number of points and a number of timings depending on the arrangement of the recording layers, the type of the disc can be determined on the basis of the detected peak values.

In the first process of disc determining operation, a peak value of a PI signal and the timing at which the peak value is outputted are measured, and the type of the disc is determined on the basis of the measured result. In the second process of disc determining operation, a peak value of an FE signal and the timing at which the peak value is outputted are measured, and the type of the disc is determined on the basis of the measured result. In the third process of disc determining operation, a peak value of a TE signal and the timing at which the peak value is outputted are measured, and the type of the disc is determined on the basis of the measured result.

However, the FE signal or the TE signal may be processed by a window function using the PI signal to remove noise components therefrom. In this modified process, the PI signal is applied to the system controller 11, and a signal produced when the PI signal is compared with a certain threshold level is used to mask the FE signal or the TE signal.

The accuracy of detection may be made stricter using the measured results from at least two of the above three processes of disc determining operation. Specifically, if the peak value of the PI signal and the timing at which the peak value is outputted, and the peak value of the FE signal and the timing at which the peak value is outputted do not meet certain conditions, then peak values and timings are measured again. Furthermore, if the timing at which the peak of the FE signal is outputted and the timing at which the peak of the PI signal is outputted do not fall within a predetermined range, then timings are measured again.

According to the present invention, as described above, a reading means applies a laser beam to a loaded recording medium while moving a focused position. Reflected-light information obtained when the laser beam is applied is observed, and at least whether the recording medium is a single-layer recording medium or a multi-layer recording medium is decided from the observed result. Therefore, the type of the recording medium can be determined even without reading management information of the recording medium i.e., even without performing a relatively time-consuming process such as a servo system start-up process. consequently, when the recording medium is loaded, the type of the recording medium can quickly be determined, and a process corresponding to the determined type of the recording medium can be performed.

As a result, the time consumed after the recording medium is loaded and before actual sounds start being played back from the recording medium can be shortened.

Since no dedicated sensor mechanism for determining the type of the recording medium is needed, the playback apparatus can be simplified in structure and lowered in cost.

When the laser beam is applied to the recording medium while moving the focused position, a deciding device detects the number of times that a peak value of reflected-light information is observed and a focused position in which one or plural peak values are observed, and determines the type of the recording medium classified according to the number of recording layers and the positions in which the recording layers are formed. Accordingly, the deciding device can accurately determine many types of recording mediums.

The focused position in which a peak value is observed can easily be detected by measuring time during the application of the laser beam while moving the focused position and detecting the timing at which the peak value is observed.

The reflected-light information observed during the application of the laser beam while moving the focused position may be represented by a reflected-light quantity signal, a focus error signal, or a tracking error signal, which is extracted from reflected-light information in ordinary playback apparatus. Therefore, it is not necessary to newly introduce a circuit system for generating reflected-light information to be observed. Since the above signals exhibit a certain level when the laser beam is focused on a recording layer, they are appropriate for performing accurate disc type determining operation.

Although certain preferred embodiments of the present invention have been shown and described in detail, it should be understood that various changes and modifications maybe made therein without departing from the scope of the appended claims.

What is claimed is:

1. An apparatus for selectively playing back a plurality of optical discs including a first optical disc having a recording layer positioned substantially on a surface of said first optical disc, a second optical disc having a recording layer positioned substantially in a middle position between surfaces of said second optical disc, a third optical disc having a first recording layer positioned substantially in a middle position between surfaces of said third optical disc and a second recording layer positioned substantially on one of said surfaces of said third optical disc, and a fourth optical disc having first and second recording layers positioned substantially in a middle position between surfaces of said fourth optical disc, the apparatus comprising:

applying means for applying a light beam to one of said first, second, third, and fourth optical discs loaded on the apparatus;

photodetector means for detecting reflected light from said one optical disc upon application of said light beam from said applying means;

signal generating means for generating a signal based on said reflected light detected by said photodetector means;

first detecting means for detecting a number of peaks of said signal generated by said signal generating means;

second detecting means for detecting timings at which said peaks of said signal are output from said signal generating means;

decision means for determining which of said first, second, third, and fourth discs is said one optical disc loaded on the apparatus based on said detected number of peaks detected by said first detecting means and said detected timings detected by said second detecting means; and setting means for setting a playback condition depending on said one optical disc loaded on the apparatus determined by said decision means.

2. The apparatus according to claim 1, wherein said signal generated by said signal generating means comprises a playback signal from said one optical disc.

3. The apparatus according to claim 1, wherein said signal generated by said signal generating means comprises a focus error signal.

4. The apparatus according to claim 1, wherein said signal generated by said signal generating means comprises a tracking error signal.

5. The apparatus according to claim 1, wherein said playback condition set by said setting means comprises at least one of a wavelength of the light beam from the applying means, a servo constant, and a decoding process.

6. The apparatus according to claim 1, wherein said applying means comprises means for applying the light beam to an inner circumferential area of said one optical disc.

7. The apparatus according to claim 1, wherein said decision means comprises means for determining a number of recording layers of said one optical disc depending on said number of peaks detected by said detecting means.

8. The apparatus according to claim 1, wherein said decision means comprises means for determining positions of recording layers of said one optical disc depending on said timings detected by said detecting means.

9. An apparatus for selectively playing back one optical disc of a plurality of optical discs including a first optical disc having a recording layer positioned substantially on a surface of said first optical disc, a second optical disc having a recording layer positioned substantially in a middle position between surfaces of said second optical disc, a third optical disc having a first recording layer positioned substantially in a middle position between surfaces of said third optical disc and a second recording layer positioned substantially on one of said surfaces of said third optical disc, and a fourth optical disc having first and second recording layers positioned substantially in a middle position between surfaces of said fourth optical disc, the apparatus comprising:

applying means for applying a light beam to said one optical disc loaded on the apparatus;

photodetector means for detecting reflected light from said one optical disc upon application of said light beam from said applying means;

signal generating means for generating a signal based on said reflected light detected by said photodetector means;

first detecting means for detecting a number of peaks of said signal generated by said signal generating means;

second detecting means for detecting timings at which said peaks of said signal are output from said signal generating means;

decision means for determining which of said first, second, third, and fourth discs is said one optical disc loaded on the apparatus based on said detected number of peaks detected by said first detecting means and said detected timings detected by said second detecting means; and setting means for setting a playback condition depending on said one loaded optical disc determined by said decision means.

10. The apparatus according to claim 9, wherein said recording layer of said first optical disc contains a recorded audio signal sampled at a sampling frequency of 44.1 kHz and quantized with sixteen bits.

11. The apparatus according to claim 9, wherein one of said first and second recording layers of one of said third and fourth optical discs contains a first recorded audio signal sampled at a sampling frequency fs (kHz) and quantized with multiple bits, and another of said first and second recording layers of one of said third and fourth optical discs contains a second recorded audio signal sampled at a sampling frequency fs×n (kHz) (n is a positive integer $\geq 2$) and quantized with one bit.

12. A method of selectively playing back a plurality of optical discs including a first optical disc having a recording layer positioned substantially on a surface of said first optical disc, a second optical disc having a recording layer positioned substantially in a middle position between surfaces of said second optical disc, a third optical disc having a first recording layer positioned substantially in a middle position between surfaces of said third optical disc and a second recording layer positioned substantially on one of said surfaces of said third optical disc, and a fourth optical disc having first and second recording layers positioned substantially in a middle position between surfaces of said fourth optical disc, the method comprising the steps of:

applying a light beam to one of said first, second, third, and fourth optical discs loaded on an apparatus;

detecting reflected light from said one optical disc upon application of said light beam;

generating a signal based on said reflected light detected in said step of detecting;

a first step of detecting a number of peaks of said generated signal;

a second step of detecting timings at which said peaks of said generated signal are output from said step of generating;

determining which of said first, second, third, and fourth discs is said one optical disc loaded on the apparatus based on said detected number of peaks and said detected timings; and setting a playback condition depending on said one loaded optical disc determined in the said step of determining.

13. The method according to claim 12, wherein said signal generated in said step of generating comprises a playback signal from the optical disc.

14. The method according to claim 12, wherein said signal generated in said step of generating comprises a focus error signal.

15. The method according to claim 12, wherein said signal generated in the step of generating comprises a tracking error signal.

16. The method according to claim 12, wherein said playback condition set in the step of setting comprises at least one of a wavelength of the applied light beam, a servo constant, and a decoding process.

17. The method according to claim 12, wherein said step of applying a light beam comprises the step of applying the light beam to an inner circumferential area of said one optical disc.

18. The method according to claim 12, further comprising the step of determining a number of recording layers of said one optical disc depending on said number of peaks detected in said first step of detecting.

19. The method according to claim 12, further comprising the step of determining positions of recording layers of said one optical disc depending on said timings detected in said second step of detecting.

* * * * *